Jan. 31, 1956 S. DOBA, JR., ET AL 2,733,436

COINCIDENCE CIRCUIT

Filed March 21, 1944 8 Sheets-Sheet 1

INVENTORS: S. DOBA, JR.
L. W. MORRISON, JR.
BY
D. MacKenzie
AGENT

INVENTORS: S. DOBA, JR.
L.W. MORRISON, JR

BY

D. MacKenzie

AGENT

INVENTORS S. DOBA, JR.
L. W. MORRISON, JR.
BY
D. MacKenzie
AGENT.

INVENTORS: S. DOBA, JR.
L. W. MORRISON, JR.
BY
D. MacKenzie
AGENT

INVENTORS: S. DOBA, JR.
L. W. MORRISON, JR.
BY: D. MacKenzie
AGENT

INVENTORS S. DOBA, JR.
L. W. MORRISON, JR.
BY D. MacKenzie
AGENT

INVENTORS: S. DOBA, JR.
L. W. MORRISON, JR.
BY
D. MacKenzie
AGENT

INVENTORS: S. DOBA, JR.
L. W. MORRISON, JR.
BY
D. MacKenzie
AGENT

United States Patent Office 2,733,436

Patented Jan. 31, 1956

2,733,436

COINCIDENCE CIRCUIT

Stephen Doba, Jr., Long Island City, N. Y., and Laurence W. Morrison, Jr., Florham Park, N. J., assignors to Bell Telephone Laboratories, Incorporated, New York, N. Y., a corporation of New York Application March 21, 1944, Serial No. 527,458

4 Claims. (Cl. 343—7)

This invention relates to an improvement in coincidence circuits whereby the simultaneous occurrence of two events may be enabled to produce any desired action, an example being the automatic actuation of a bomb release mechanism. The invention provides a system of apparatus particularly useful for low altitude bombing of enemy targets through overcast.

The general object of the invention is therefore to provide a novel form of coincidence circuit, a particular object being to provide means for the automatic release of bombs from an airplane pursuing an enemy target visible or invisible.

The system of the invention includes means for establishing a voltage proportional to the speed of the attacking plane relative to the target attacked together with means for compensating drift due to cross wind or to transverse motion of the target as well as means for ranging and locating the target. It is accordingly another object of the invention to provide a bombing plane with means to fly a collision course toward a target to be attacked and to measure the range of that target and the speed of approach thereto, and to release bombs when at a suitable distance from the target.

The functional operation of the invention will first be described before explaining the organization of its component parts. An electrical object locating and ranging system of the radar type with its associated cathode ray oscilloscope, in combination with the apparatus of the invention, enables the bombardier of the airplane to select a target ahead a distance of about ten miles, to fly a collision course toward the target and to measure his speed relative thereto. The plane will be understood to be provided with the usual airspeed and altitude meters.

It will be noted that the system of the invention includes a circuit for deriving a voltage proportional to airplane speed relative to the target. The circuit not itself a part of the present invention is disclosed and claimed in the copending application of S. Doba, Jr. filed March 21, 1944, Serial No. 527,459, now Patent No. 2,406,358 dated August 27, 1946. Also involved in the system of the invention are sweep voltage generators which are disclosed and claimed in the copending application of J. W. Rieke, filed March 21, 1944, Serial No. 527,457, now Patent No. 2,452,683 dated November 2, 1948. To enable the plane to fly a collision course toward the target a drift compensator is employed which is described and claimed in the copending application of S. Doba, Jr., filed March 21, 1944, Serial No. 527,460, now Patent No. 2,418,465, dated April 8, 1947. All of the copending applications mentioned are assigned to the same assignee as the present application.

The system of apparatus of the invention to be disclosed herein will be understood from the following description, read with reference to the accompanying drawings in which.

Figures 5, 6, 12:
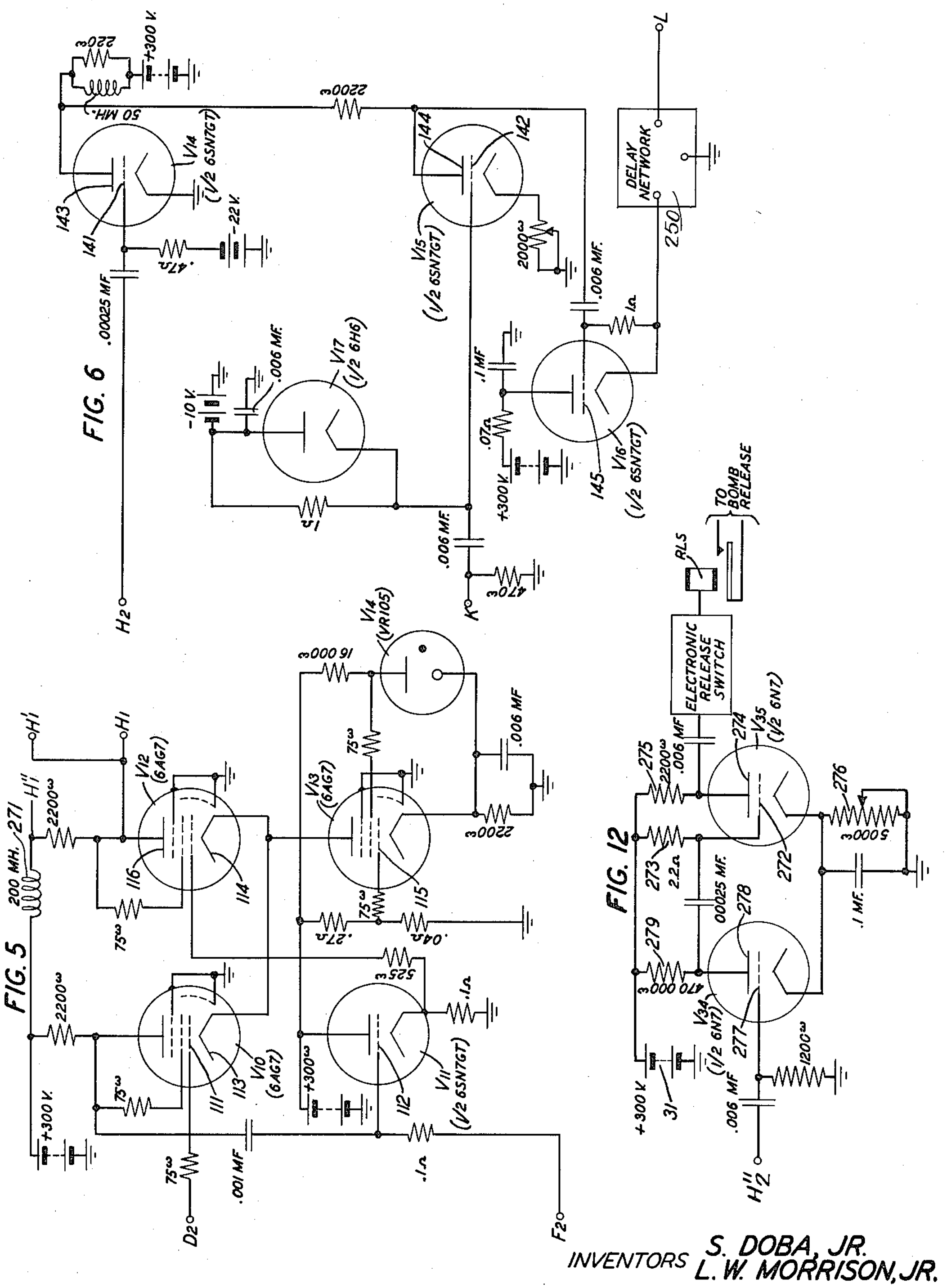
Fig. 5 is the circuit of range differential amplifier 110.
Fig. 6 is the circuit of video mixing amplifier 140.
Figure 14A:
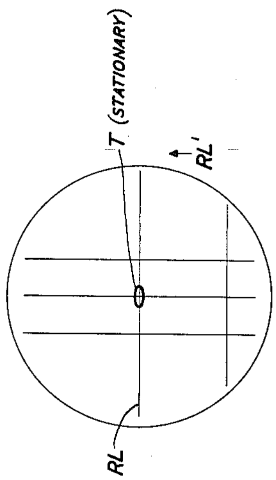
Figure 14:
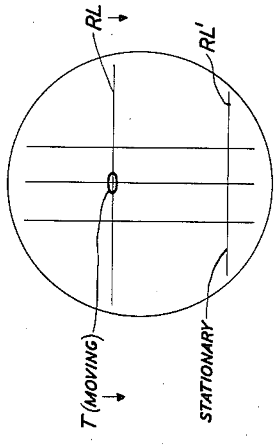
Figure 11:
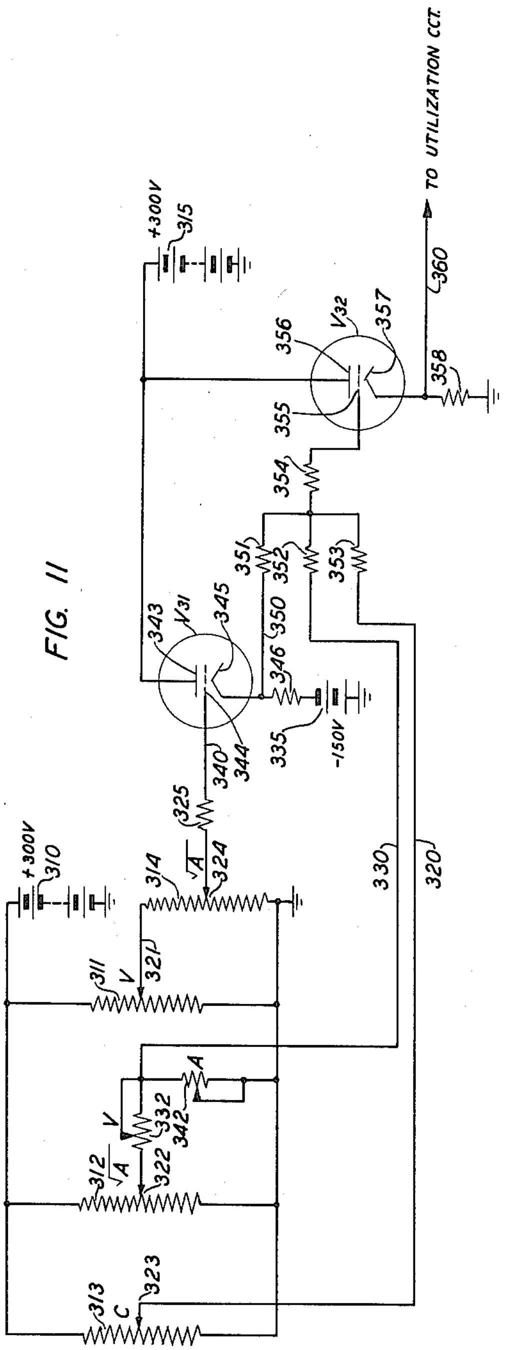
Fig. 11 is the circuit of computer 280.
Figure 11A:
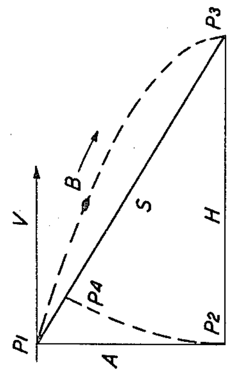
Figures 13, 13A:
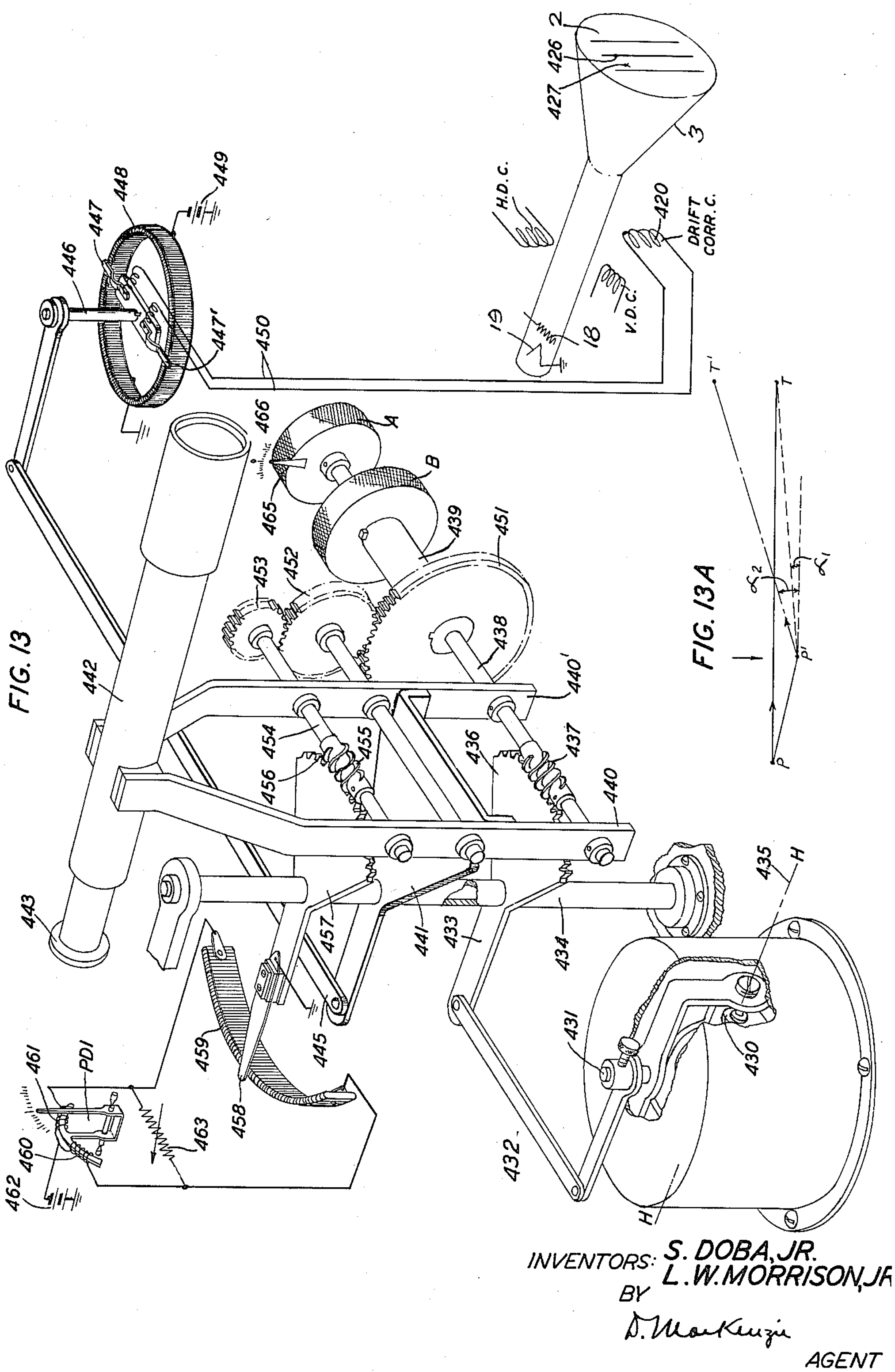

Fig. 11A exhibits the geometrical relations involved in the circuit of Fig. 11;

Fig. 12 is a simplified diagram of release relay circuit 290;

Fig. 13 shows the apparatus of drift compensator 300;

Fig. 13A exhibits geometrical relations concerned in the compensation of drift;

Fig. 14 shows the appearance on the oscilloscope screen when switches S, S′ and S″ are closed upward; and Fig. 14A shows the appearance on that screen when switches S, S′ and S″ are closed downward.

The radar equipment, besides providing a train of waves to be echoed from a target, furnishes an azimuth sweep voltage directly to the cathode ray oscilloscope, a zone blanking voltage to the video amplifier for suppressing the cathode ray trace when the echoing object is abaft the beam of the attacking plane and a video signal to the video mixing amplifiers. For calibration this signal is delayed 1.5 microseconds to allow the azimuth and vertical sweeps to start just ahead of its arrival at the indicator.

Each trigger pulse of the radar, initiating a pulse of the outgoing train, is at the same time supplied to actuate a time base generator which produces a negative square-topped voltage pulse of 100 microseconds duration. This negative pulse is supplied simultaneously to the range sweep generator and the release sweep generator. By the range sweep generator there then is produced a positive saw-tooth voltage, rising linearly with time at a predetermined rate, superimposed upon a pedestal voltage later required to unblank the oscilloscope trace. The time base generator provides a 100-microsecond square-topped positive pulse as well as the negative pulse mentioned. It is from this positive pulse that the pedestal voltage is obtained. The release sweep generator produces a truncated saw-tooth voltage pulse with a small pedestal voltage. Each of these pulses occupies the 100-microsecond interval, the release sweep pulse becoming flat-topped after about 18 microseconds. The truncated saw-tooth voltage from the release sweep generator rises at a fixed rate of approximately 5 volts per microsecond, that is, from about 90 to 190 volts in 18 microseconds, whereas the voltage (including pedestal) from the range sweep generator is set to rise from about 90 to 190 volts in 100 microseconds. The release sweep pulse is truncated, after an interval amply long for the release operation, because a higher voltage is not needed and would be hard to obtain and to keep linear over the 100-microsecond interval at the same rate of rise.

The saw-tooth pulse with pedestal from the range sweep generator is supplied directly to the range differential amplifier. Also, when the search-track switch is in search position, a fraction of this pulse is supplied directly to the vertical sweep amplifier.

When the search-track switch is on "search," a vertical sweep of the cathode ray trace is produced, beginning at the start of the 100-microsecond interval and lasting for that time. The appearance of the trace is blanked until there arrives either a radar echo pulse, a range pulse, or a release pulse. These pulses act in turn, or ultimately at the same time, on the intensity grid of the oscilloscope to produce visible traces which appear as lines for the range and release pulses and as a spot for the echo. When the switch is moved to the track position, the vertical sweep begins at the instant of equality of range and rate sweep voltages and last for only 11 microseconds thereafter. In this case also the visible trace appears when brightened by one of the three signals above mentioned. In each switch position, the three brightening pulses are delayed 5 microseconds for a reason later set forth. A permanent magnet, not shown, is used to cause all sweeps to start at the bottom of the oscilloscope screen.

The rising output voltage of the range sweep generator is combined on the input of the range differential amplifier with a voltage, decreasing with time, from the rate sweep generator. The rising output voltage of the release sweep generator is combined on the input of the release differential amplifier with a voltage group representing the slant range from plane to target at which bombs are to be released, together with a voltage allowing for the time spread at which the bombs are to be individually released. The computer circuit to be later described controls both the rate sweep generator and the release slant range voltage.

When the rising voltage from the release sweep generator equals the release slant range voltage, the release differential amplifier produces a square-topped positive pulse, at an instant later than the start of the 100-microsecond interval by a definite time, namely, that which the bombs will take to fall from a plane to a target on the surface of the ground or of the ocean. This pulse continues to the end of the 100 microseconds. The necessary adjustment is later described.

The voltage from the rate sweep generator is made, by adjustment of the position control of the computer, to start from an initial value corresponding to an initial range from plane to target, allowance being made in the adjustment for the pedestal of the voltage from the range sweep generator. The rate sweep generator voltage decreases from this initial value linearly with time at a rate fixed by adjustment of the ground speed control of the computer to be proportional to the plane velocity. How these adjustments are made is the subject of a later paragraph. For the present they may be considered correctly made so that at any instant the voltage from the rate sweep generator represents the instantaneous slant range from plane to target.

The saw-tooth voltage with pedestal from the range sweep generator, rising linearly with time, is combined on the input of the range differential amplifier with the voltage from the rate sweep generator falling linearly with time at a rate proportional to plane velocity. When these voltages attain equality with each other the range differential amplifier produces a square-topped positive pulse, at an instant later than the start of the 100-microsecond interval by a time corresponding, as later explained, to the range at that moment from plane to target. Thereafter the pulse continues to the end of the 100-microsecond interval. Since the slant range is continually decreasing, this pulse occurs earlier and earlier until it finally coincides in time with the pulse from the release differential amplifier.

Both these square-topped pulses, which may be called, respectively, the release pulse and the range pulse, are supplied directly to the video mixing amplifier and there join a video or trigger pulse delayed 1½ microseconds from the radar. The range pulse is also supplied, through the search-track switch in track position, to the indicator sweep amplifier from which it goes to unblank the cathode ray oscilloscope trace. Accompanying the onset of each of these pulses, a positive kick is produced across an inductance common to the output circuits of both range and release differential amplifiers, and these kicks are supplied as sharp pulses to the release relay circuit. The subsequent negative kick is disregarded. When these pulses coincide in time they are summed to actuate the release relay circuit and the bombs are dropped. The kicks may alternatively be produced across separate inductances and supplied to separate grids of a mixer tube where they multiply each other at coincidence.

The range pulse is delayed with respect to the trigger pulse from the radar by the time interval during which the voltage in the saw-tooth pulse from the range sweep generator is building up to equality with the decreasing voltage from the rate sweep generator representing the instantaneous range of the target. The rate sweep voltage is a sweep requiring from one and one-half to six minutes for its completion and during any 100-microsecond segment of this sweep time the target range does not sensibly change. Likewise the release pulse is delayed with respect to the pulse from the time base generator by the interval during which the voltage from the release sweep generator is rising to equality with the voltage from the computer representing the slant range, never greater than 7,000 feet, at which bomb release is desired.

It is to be noted that no echoes are involved in the operation of either the release or the range differential amplifier. An adjustment during the run makes the decreasing voltage from the rate sweep generator represent, at any instant in its decay, the slant range at that instant from plane to target. Similarly, an adjustment makes the combination voltage from the computer represent at all instants the slant range at which bombs are to be released. The range sweep generator and the release sweep generator therefore have the functions of producing plane position scales for the range and release pulses, respectively.

The moment of equality of rising range sweep voltage and decreasing rate sweep voltage determines a time interval between the impression of the trigger pulse and a brightening of the trace on the cathode ray oscilloscope. Since the moment of equality comes earlier the closer the plane gets to the target, the shorter this time interval the closer is the target and the start of the square-topped pulse from the range differential amplifier follows the start of the saw-tooth from the range sweep generator by a time interval representing the slant range of the target. The pedestal of the saw-tooth voltage is allowed for in the rate sweep voltage when the position adjustment is made. When the instantaneous range of the target is zero, the rate sweep voltage has fallen to equal the pedestal value of the release sweep and the moment of equality of range and rate voltages occurs at the start of the saw-tooth.

Just as the interval between the trigger pulse and range pulse represents the instantaneous target slant range, so the interval between trigger pulse and release pulse represents a target slant range (fixed by adjustment of slant range voltage from the computer and of release sweep voltage) at which bomb release is desired. The rate of increase of the release sweep voltage is five times that of the range sweep voltage, wherefore the slant range voltage from the computer must be adjusted to make the time interval from trigger pulse to release pulse represent range on the same scale as does the interval from trigger pulse to range pulse.

The square-topped positive pulse from the range differential amplifier, starting at the moment range and rate sweep voltages become equal and lasting thereafter to the end of the 100-microsecond interval, is caused to produce a sharp positive pulse which makes conductive the range pulse amplifier, a tube forming part of the video mixing amplifier. Similarly, the square-topped positive pulse from the release differential amplifier which starts when the release sweep voltage equals the computed release range voltage and lasts to the end of the 100-microsecond interval, is caused to produce a sharp positive pulse on the grid of the release pulse amplifier, a tube forming another part of the video mixing amplifier and having its anode-cathode circuit in parallel with that circuit of the range pulse amplifier tube. Actually these tubes are two triodes in a single envelope.

These positive grid pulses produce at the respective anodes negative pulses which appear, successively or simultaneously, at the anode of another triode known as the video gain amplifier.

From this amplifier the negative anode pulses are transferred to the grid of another triode in the same envelope which limits all signals to 3 volts and has its load resistor in the cathode return. Thereby the negative pulses on its grid also appear as negative voltage pulses, cathode to ground, and are fed to the main video amplifier through a 5-microsecond delay network. The purpose of this delay network will be later pointed out. Lines on the screen of the cathode ray oscilloscope are produced by these negative pulses, the release pulses corresponding in time to the slant distance from plane to target at which bombs are to be released. The negative pulses appear as positive pulses on the output of the video amplifier and are superimposed on a positive pedestal voltage, derived from the range differential amplifier, through the search-track switch in track position and the indicator sweep amplifier. The pedestal voltage, with superimposed positive range, echo, and release pulses, is applied to the intensity grid of the cathode ray oscilloscope.

When the search-track switch is in search position, the vertical sweep amplifier receives a pedestal voltage on which is superimposed a sweep voltage directly from the range sweep generator. This is the fraction previously mentioned of the output of that generator. In this case the cathode ray oscilloscope trace is unblanked throughout the whole 100 microseconds duration of the time base pulse. On this unblanked trace there appear the range and the release lines, each delayed 5 microseconds in addition to its own delay from its own differential amplifier. Since 10 microseconds approximately represent 1 mile and the location of the range pulse in the 100-microsecond time base interval corresponds to the instantaneous distance from plane to target, the range line can show on the trace for any target within 9½ miles, the last ½ mile being excluded by the 5-microsecond delay of range and release pulses purposely introduced after the video mixing amplifier.

The video amplifier also receives from the radar a connection, made when the radar antenna points abaft the beam of the plane, which blanks out the cathode ray oscilloscope trace. This connection is replaced by a ground when the antenna points anywhere in the hemisphere forward of the plane. This disabling of the blanking connection allows the pedestal voltage from the vertical sweep amplifier to unblank the trace and the video pulses from the radar and the range pulses are allowed to brighten the trace at the instants of their respective occurrences. To this pedestal pulses are added, with 5-microseconds delay, the range and release pulses of the corresponding differential amplifiers through the video mixing amplifier and the video amplifier, together with the radar echo, and the trace appears as a line for each pulse and a spot for the echo.

The vertical sweep amplifier receives, when the search-track switch is on search, a fractional sweep and pedestal voltage directly from the range sweep generator. This voltage, with pedestal cut off by an initial tube bias, is applied to provide a sweep current through the vertical deflecting coil of the cathode ray oscilloscope, rising linearly with time from zero at the start of the 100-microsecond interval and continuing throughout that interval. When the search-track switch is on track, the square-topped positive pulse from the range differential amplifier is received by the vertical sweep amplifier and this pulse produces a linear sweep starting at the moment range and rate voltages are equal and lasting only 11 microseconds.

The deflection of the cathode ray oscilloscope spot is thus controlled, vertically from the vertical sweep amplifier for intervals of 100 microseconds, or 11 microseconds, horizontally by a voltage from the azimuth potentiometer in the radar. Both vertical sweeps start 1½ microseconds before the video signals appear on the oscilloscope screen.

The azimuth sweep is continually recurrent, being controlled by the rotation of the radar emitter. The range pulse which brightens the cathode ray oscilloscope trace will appear drawn out into a horizontal line on the screen. This is for the reason that such a bright spot occurs for every trigger pulse, that is to say, several thousand times a second, and these spots fuse. Similarly, the release pulse appears as a horizontal line, below that of the range pulse since the vertical sweep is upward from an initial position and the release pulse occurs at a fixed time after the trigger pulse and at a varying interval before the range pulse.

When the search-track switch is on search, the rate sweep voltage variation is disabled and the output of the rate sweep generator is a constant voltage. This voltage is equaled by the range sweep voltage at a constant time interval after the start of the vertical sweep. The oscilloscope screen then shows a stationary horizontal range line near the top, with a similar release line near the bottom. The portion of the screen used represents slant distances from plane to target between 3½ and 10 miles so that echo spots representing targets within these ranges appear on the screen and from them a desired target may be selected. By the position control of the computer the range line is moved, by setting the voltage from the rate sweep generator, to coincide with the selected target, represented by a spot on the cathode ray oscilloscope screen in a position which corresponds horizontally to the target azimuth, vertically to the target range. By adjustment of the drift compensator the target spot is brought to coincide with a vertical line through the center of the screen.

The adjustment of the position voltage to make coincident the range line and the target echo brings it about that the range pulse occurs at the same time in the 100-microsecond interval that the echo returns, allowance for the 1.5-microsecond delay of the echo having been made in calibration. When the control of the rate sweep voltage is restored, by shifting the switch to track, the rate of decrease of this voltage is set to maintain coincidence of echo and release line, and thereby this rate of decrease is a measure of the plane's velocity in the line of sight. This velocity is substantially the ground speed of the plane when the target is some miles distant, and the setting of the rate sweep voltage decrease is left alone when the target is near. The adjustments just described of position voltage and its rate of decrease insure that the interval between the start of the 100-microsecond interval and the appearance of the range pulse shall represent the instantaneous slant range from plane to target.

On shifting now the switch to the track position, a vertical sweep of 11 microseconds duration is produced starting at the onset of the square-topped pulse from the range differential amplifier. In this switch position there is restored the time decrease of voltage to the rate sweep generator so that the pulse starting the short vertical sweep starts now at an instant corresponding to the instantaneous target range, that is, to the instant of return of the radar echo if this echo is not purposely delayed. With no delay introduced, the target image and the range pulse line will appear at the bottom of the screen from which the sweep starts. By introducing 5-microseconds delay, the range line and the target spot, made initially coincident by setting the position voltage and kept so by setting the rate of decrease of the rate sweep voltage, are made to appear at the center of the screen. The instant of time represented by the range line in this situation is earlier and earlier as we approach the target but fixed on the screen by the fact that the vertical sweep starts correspondingly earlier and earlier, there being kept a 5-microsecond or ½-mile interval between starting of sweep and brightening of the trace by the range pulse. The whole vertical extent of the screen is now covered in 11 microseconds; therefore the release line will not show until the range is only ½ mile greater than the slant range at which bomb release is desired. At this moment the release line appears at the bottom of the screen, moving up to coincde with the range line when the actual slant range equals the release slant range. This motion of the release line is due to the fact that the vertical sweep is now made to begin at the onset of the square-topped pulse from the range differential amplifier at an instant in the 100-microsecond interval corresponding to the instantaneous slant range which is continually decreasing. The range pulse starting the vertical sweep comes earlier and earlier in time, so that starting the sweep at the instant of recurrence of the range pulse amounts to making the observed position of the range line, namely, horizontal through the center of the screen, represent a continually earlier time instant.

Both range and release pulses together with the radar echo signal are purposely delayed 5 microseconds between the video mixing amplifier and the video amplifier. This means that a vertical sweep starting from the bottom of the screen simultaneously with the pulse from the range differential amplifier and reaching the top of the screen 11 microseconds later, will find the delayed target image and equally delayed range line at its mid-point. The release pulse with the same 5-microsecond delay, however, occurred before this sweep started and has no chance to appear until the time interval between range and release pulses is reduced to 5 microseconds. The release line, therefore, first shows at the moment of starting of the sweep, namely, at the bottom of the screen, and travels upward because from this instant on the sweep starts progressively earlier than the arrival at the cathode ray oscilloscope of the release pulse.

The computer element of the equipment enables the bombardier to compute the slant range at which the bombs are to be released, a range depending upon the ground speed and on the altitude of the plane and expressed as a voltage supplied to the release differential amplifier. Here it joins the voltage produced by the release sweep generator. The release sweep voltage rises steeply, starting at the same time as the voltage from the range sweep generator but becoming constant after about 18 microseconds. When the computed slant range voltage is equal to the rising release sweep voltage the positive square-topped release pulse is produced by the release differential amplifier. This pulse lasts to the end of the 100-microsecond interval.

It is convenient to express the computed release slant range voltage as the sum of two component voltages, one representing the horizontal component of the slant range and the other representing the difference between the slant range and its horizontal component. If this decomposition can be made, the two components may be obtained from potentiometers. One of these potentiometers is already provided to derive a voltage proportional to ground speed (strictly, to relative slant range speed) which controls the rate of decrease of the rate sweep voltage to maintain coincidence of target image and range line on the CRO screen. The ground speed thus determined, together with the altitude read from an altimeter, determines the horizontal distance traversed by the plane during the time of fall of the bomb. As an approximation air resistance is neglected.

If V is the ground speed in feet per second and A the altitude in feet the time of fall is $$T=\sqrt{\frac{2A}{G}}$$

G being the acceleration of gravity, and H the horizontal release distance is VT or proportional to $$V\sqrt{A}$$

Also it can be shown that to a satisfactory approximation the difference between the release slant range S and its horizontal component H is proportional to $$\frac{A^{\frac{3}{2}}}{V+\sqrt{A}}$$

For the highest altitude and ground speed conditions where the computer is used, namely, 2,000 feet and 400 miles per hour respectively, the difference between the slant release range and its horizontal component is less than 5 per cent of the latter. The voltage representing $S-H$ is thus always small compared to that representing H.

The ground speed voltage, besides being furnished directly to control the rate of decrease of the rate sweep voltage, is fractionated proportionally to the square-root of the altitude. This gives a voltage representing $H=VT$. Another potentiometer, supplied from the same voltage source as the ground speed potentiometer, is traversed by a wiper which selects a resistance to ground proportional to the square-root of the altitude. The voltage between this wiper and ground is supplied through a variable resistance, which is set to a value proportional to V, to a resistance made proportional to the altitude. The voltage across this last resistance is representative of $S-H$.

It is customary to release the bombs successively instead of all at once in order that the hits shall be spread in front of and behind as well as at the theoretical end of the slant release range. For this reason the first release must be advanced a short interval and a "spread" voltage is added to the H and $S-H$ voltages already established. The spread voltage is also small compared with the H voltage, and the latter is isolated by a buffer tube from the small voltages with which it cooperates in order that the velocity voltage fed to the rate sweep generator may not be corrupted.

Each of the three voltages, which together determine the release of the first bomb, is supplied through a quarter megohm resistor to the input of a summing amplifier from which a summation voltage is fed to the release differential amplifier. For the first bomb to land in front of the target it must be released at a greater slant range than is computed by adding H and $S-H$. Thus the total voltage from the release switch generator is increased by the spread voltage and the release pulse occurs correspondingly later in the 100-microsecond interval and meets that much earlier the range pulse.

It is necessary that the time interval between the start of the release sweep and the occurrence of the release pulse represent slant range to the same scale as actual range is represented by the interval between the start of the range sweep and the occurrence of the range pulse. This requirement is met in calibrating the system. An echo box reflects the radar signals from measured distances of 2,000, 3,000, and 4,000 feet in successive tests. With maintained coincidence of range line and target image on the CRO screen, ground speed and altitude dials in the computer are set to compute the measured slant range, the spread dial being retarded. A setting of the ground speed dial has been effected in establishing the coincidence of range line and target image. The range pulse now occurs at an instant in the 100-microsecond interval corresponding to the actual range and, if the spread dial is advanced until the release relay operates, the condition is established that the release pulse also occurs at an instant corresponding to the measured actual range. The setting thus arrived at is a zero reading which allows for manufacturing imperfections and for the small pedestal of the release sweep voltage.

Position and velocity voltages are furnished the range differential amplifier from the rate sweep generator. This is in principle a condenser, charged when the search-track switch is in "search" position and discharging when the switch is moved to "track." The rate of discharge is controlled by a voltage from a wiper on a potentiometer across which is impressed the voltage of the power supply. The discharge rate, proportional to this fractional voltage, is adjusted to maintain coincidence on the CRO screen of the range line and target image after these traces have been made initially to coincide. For any initial range from plane to target the range line and the target image can be brought into coincidence when the switch is on search, by selecting the proper fraction of the steady voltage to which the condenser is charged.

The voltage so selected is furnished to the input of the range differential amplifier to bring about the appearance of the range pulse at an instant in the 100-microsecond interval coinciding with the return of the radar echo. On the output of the video mixing amplifier the range pulse from the range differential amplifier joins the radar echo delayed by 1.5 microsecond. This time delay of the echo is allowed for in the system calibration, specifically, in the step already described which is the third to be taken.

The first step in calibration is that of adjusting a bias voltage to make the release relay operate when the range line (moving because the search-track switch is on "track") coincides with a stationary release line. In this step no use is made of a target spot. The second step is an adjustment of the range zero setting on the control unit (which includes the computer and the controls implied in the foregoing) to make the release relay operate at the start of the range and release sweeps. This fixes the coincidence of the time zeros of the two sweeps. No target spot is required for this setting. The third step involves the target spot, delayed 1.5 microseconds. Here if no allowance is made for this delay the spot would show on the screen above its ideal position, that is, at an apparent range some 740 feet greater than the true range. Adjusting the range line to coincide with this delayed spot delays the range pulse the same amount and if no allowance is made for the delay the bombs will be released too late. For this allowance, the spread dial is advanced enough to make the release relay operate when, at the actual measured target range the range line coincident with the target spot is met by the release line. In effect the reference is to a fictitious target 740 feet further off than the real one. The spread zero adjustment therefore allows in one lump for the 1.5-microsecond delay and whatever electrical delays may have been incurred since the trigger pulse.

It is obvious that the spread zero obtained as just described is fixed for the particular assembly of apparatus. It is a reading on the spread dial from which departure is made only for dropping the first bomb of a series in front of the target or for any other purpose which requires advancing or retarding the actual moment of release relative to the theoretical. One such purpose is that of compensating the effect of air resistance which slows simultaneously the fall and the forward travel of the bomb.

The operation so far described has referred to a collision course flown by the plane toward the target. This course is preferred to a pursuit course in which the plane's heading changes continuously to head straight for the target. Movement of the target, or windage across the line of sight, requires that the heading of the pursuit plane so allows for such target movement or drift that the course made good by the plane shall be a straight line drawn to the target from the point of establishment of relative speed on the ground speed dial.

Assume a plane traveling 400 miles per hour in a cross wind of 20 miles per hour. If at a given moment the plane is headed directly toward a target 10 miles away, it will in ½ minute have advanced 3⅓ miles in the direction of heading and have drifted ⅙ mile at right angles to this direction. The target will now be approximately 6⅔ miles away and will bear about 1.4 degrees from dead ahead, the course made good being about 2.9 degrees off the apparent course. The line of sight from plane to target, which in the present indicator is defined by the location of the target spot horizontally of the screen, must be brought to bear upon the actual target and kept in this direction in space if the plane is to fly a collision course from this point. In the 6⅔ miles yet to fly the plane must be so headed as to overcome in this distance forward the drift already incurred as well as that yet to take place. In the example chosen this total will be ½ mile. If the plane has been drifting to the right, it must now be headed toward a point ⅓ mile from the target in a direction at right angles to the left of the original line of sight. That is, the plane must change heading by 4.3 degrees to the left so that in traveling 6⅔ miles in the new direction it would, if without drift, reach a point ⅓ mile to the left of the target, a deviation exactly cancelled by the drift in the 1-minute time of flight. The change in heading of the plane must, in this example, be about three times the change in the sighting direction. The heading so changed will cause the plane to fly a collision course toward the target from the point at which the change was made and since the sight was laid on the target at this point and is fixed in space regardless of the plane's change of heading, the sight will continue on the target and the range pulse will truly register the distance to the target on the collision course.

The leeway of the plane is in the example above 2.9 degrees and the sight is changed 1.4 degrees to lie again on the target while the plane's heading is changed 4.3 degrees. Generally, then, the change in heading to fly a collision course minus the change in the angle made with the plane's fore and aft axis by the line of sight is the leeway. The procedure now to be described requires that a target be present toward which the plane is intended to fly in a straight line, and that without leeway the sight line be parallel with the fore and aft axis of the plane.

The plane is presumed already to be equipped with a gyroscopically controlled optical bombsight. The telescope of that bombsight is carried on a structure rotatable about an axis fixed in the plane and vertical when the plane's fore and aft axis is horizontal. This structure is connected by a link to the gyroscope axis in such fashion that as the heading changes the line of sight turns relatively to the plane's fore and aft axis and keeps constantly on the target. When the target is sighted by the radar it appears as a spot on a line horizontally centered on the CRO screen when the plane is headed directly toward the target. This is because the azimuth potentiometer of the radar is adjusted to give zero output voltage when the antenna is lined up with the plane's axis and for this condition centering controls are adjusted to center this spot horizontally on the screen.

In the present system an additional potentiometer is provided for drift correction. This potentiometer, supplied from its own battery, is fixed in the aircraft in a plane at right angles to the axis around which turns the optical bombsight support, and is swept by a wiper linked to this support. Rotation of this support, which is caused by the gyroscope link when the heading changes, will then rotate the wiper from the position of zero output voltage in which it stands when the line of sight is dead ahead and the voltage thus derived is applied to a drift correction coil to deflect the target spot back to the central line it stood on when the plane was headed for the target. The line of sight is constrained to turn away from the plane's axis to keep constantly pointed at the target and the angle of rotation of the wiper from this neutral position is the bearing of the target. If a collision course is being made good this angle is the leeway.

The CRO screen is marked with three vertical lines, one central, and the others each 6 degrees off center. If a collision course is not being flown the target spot will deviate from the central line and to correct this the observer will turn a knob which moves the bombsight support and with it rotates the wiper of the drift correction potentiometer enough to derive a voltage deflecting the target spot back to the line it had left. At the same time, the observer grips also another knob which shifts a wiper on a potentiometer controlling the pilot's direction indicator. Gearing between these knobs is such that for every degree turn of the bombsight (and with it the drift deflection potentiometer wiper) the pilot's indicator shifts 6 degrees. The pilot accordingly changes heading. The gyroscope preserves the new direction in space conferred on the line of sight. If the new heading allows the plane to fly a collision course the restored spot will stay centered. Recorrection, if necessary, will bring about the collision course.

Figure 1:
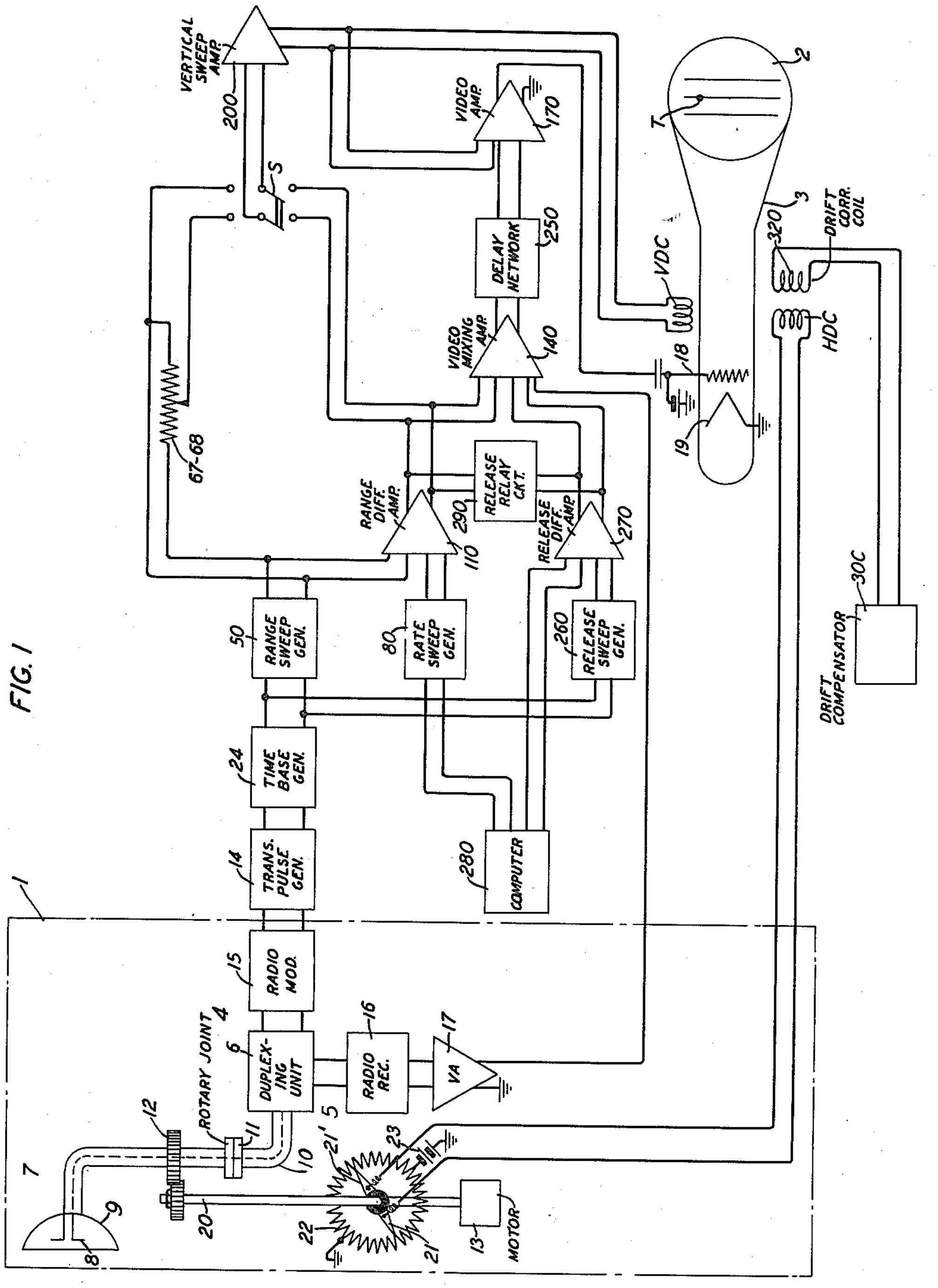
Fig. 1 is a schematic block diagram of the components of the system.

Referring now to Fig. 1, the radar system generally indicated by numeral 1, not itself a part of the present invention but here briefly described to facilitate understanding of the complete system, serves to detect the presence of a target ahead and represent that target by a luminous spot T on screen 2 of cathode ray oscilloscope 3. The location of spot T on screen 2 corresponds as later explained to the range and bearing, at a given instant, of the target represented.

System 1 includes a pulse transmitting circuit 4 and a pulse receiving circuit 5 connected through duplexing unit 6 to a common antenna 7 which is preferably of the highly directive type consisting of a small polarized dipole 8 at the focus of a parabolic reflector 9. Antenna 7 is connected by a coaxial link 10 through duplexing unit 6 to the circuits 4 and 5, with a rotary joint 11 in link 10. The portion of link 10 above joint 11 is provided with gearing 12 through which motor 13 is enabled to rotate antenna 7 at a constant speed in the horizontal plane. Rotation of antenna 7 in a vertical plane may be accomplished by a like arrangement of motor and gearing which is omitted here as unnecessary to the present description. The pulse generator 14 supplies a positive square-top pulse of very short duration to control radio modulator 15 to supply at a convenient repetition rate extremely short and intense pulses of radio frequency energy to antenna 7 by which these pulses are directively radiated into space. Duplexing unit 6, which may be an automatic transmitter-receiver switch of any known type, effectively short-circuits the input to receiving circuit 5 while antenna 7 is emitting but allows free passage to circuit 5 of the low level echo received by antenna 7 from a reflecting target. The interval between successive emissions by antenna 7 is made longer than enough to include the reception of radio echoes from the most distant target to be attacked.

A portion of the energy radiated by antenna 7 is intercepted and reflected, usually diffusely, by the target. A part of this reflected portion is received by antenna 7 and transformed into an electrical pulse which passes through duplexing unit 6 to radio receiver 16 in circuit 5 where it is amplified and detected. The detected pulse is further amplified by video amplifier 17 and is thus available to produce intensity modulation of the cathode ray beam of oscilloscope 3. Oscilloscope 3 may be of the well-known magnetic deflection type and is not shown in detail in Fig. 1 beyond intensity grid 18, cathode 19, fluorescent screen 2 and deflecting coils HDC and VDC for horizontal and vertical beam deflection, respectively.

Shaft 20, through which motor 13 drives gear 12, carries a pair of potentiometer wipers 21 and 21' insulated from each other and from shaft 20 on which they are mounted radially opposite each other. Wipers 21 and 21' traverse potentiometer 22 fixed in the airplane. Battery 23 is connected across diametrically opposite points of potentiometer 22. The rotation with shaft 20 of wipers 21 and 21' selects a fraction of the voltage of battery 23 ranging from zero when the pointing of antenna 7 is directly ahead to a maximum when antenna 7 points abeam. The polarity of the selected voltage depends on the left or right pointing of antenna 7 and the voltage so selected is applied to produce a current in horizontal deflecting coil HDC of oscilloscope 3. Auxiliary means, not shown, are provided for horizontal centering of the cathode ray beam on screen 2 when wipers 21 and 21' select zero voltage.

When the echo pulse from the reflecting target is available on grid 18 to produce intensity modulation of the cathode ray beam a luminous spot T representing the target will appear on screen 2 located vertically thereon at a position corresponding to the target range provided a vertical sweep current, synchronized with the emission of energy from antenna 7, is caused to flow in vertical deflecting coil VDC. The horizontal sweep current in coil HDC insures that the target spot will appear displaced left or right on screen 2 according to whether the bearing of the target is left or right. For the present purpose, it is assumed that the target is directly ahead.

It is convenient to describe functionally the operation of some of the major components of the system of Fig. 1, postponing the detailed description of the involved circuits.

Each trigger pulse from pulse generator 14 initiates the emission of a pulse of radio frequency energy from antenna 7 and at the same time is supplied to actuate time base generator 24. Generator 24 produces a pair of voltage pulses of opposite polarity and lasting for approximately 100 microseconds, which are both supplied to range sweep generator 50, the negative pulse serving to excite in generator 50 a positive sweep voltage rising through a voltage range of about 100 volts linearly with time at a predetermined rate throughout the 100-microsecond interval, the positive pulse producing a positive pedestal voltage on which is superposed the rising sweep voltage. This sweep voltage on a pedestal recurs with each radar emission and starts simultaneously therewith. It is supplied by range sweep generator 50 at all times to range differential amplifier 110 and when switch S is closed upwards it is fractionally supplied also to vertical sweep amplifier 200.

Rate sweep generator 80 produces a sweep voltage slowly decreasing linearly with time from an adjustable initial value and at an adjustable rate of decrease. This sweep voltage occupies from 100 to 400 seconds to decrease through a range of 100 volts, so that throughout any 100-microsecond interval it may be considered constant. The output of generator 80 is likewise applied to range differential amplifier 110. Obviously, the initial value of the decreasing output voltage of generator 80 may be chosen less than the maximum value reached by the rising voltage of generator 50 so that in each 100-microsecond interval there will be an instant of equality of the two voltages on the input of range differential amplifier 110. As the voltage from generator 80 slowly decreases this instant of equality will occur progressively nearer to the start of the 100-microsecond interval, that is to say, nearer to the moment of emission of an object ranging pulse from antenna 7.

To anticipate the later description, it may here be said that the voltage from generator 80 is so chosen that at a given time the instant of equality of the sweep voltages from generators 50 and 80 occurs simultaneously with the reception by antenna 7 of an echo reflected from a chosen target and the rate of decrease of the voltage from generator 80 is so adjusted that this instant continues to occur simultaneously with the reflected echo as the range of the target decreases. Clearly, the means which so sets the rate of voltage decrease affords a measure of the rate of change of range of the target, that is to say, of the relative speed of target and plane. If the target is stationary and the plane's altitude is not a large fraction of the plane to target distance, the speed so measured is the ground speed of the airplane.

Before continuing the functional description of the system of Fig. 1 it is proper here to describe the circuits so far involved.

Figure 2:
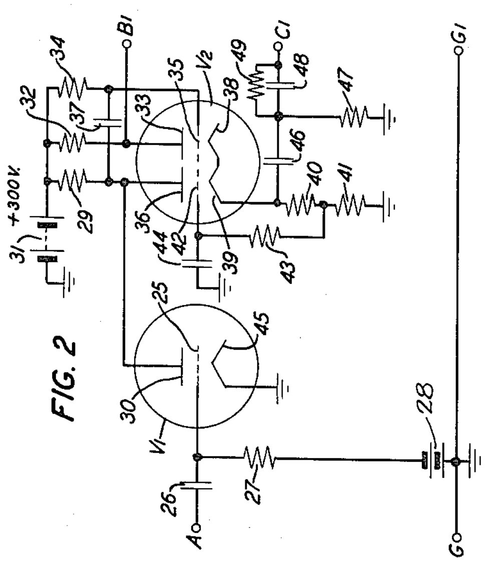
Fig. 2 is the circuit of time base generator 24.

Referring now to Fig. 2 a short positive trigger pulse from pulse generator 14 is applied to grid 25 of tube $V_1$, which is suitably a 6SN7, after differentiation by the circuit comprising condenser 26 and resistance 27. Grid 25 of tube $V_1$ is negatively biased by battery 28 so that tube $V_1$ is normally not conducting. Differentiating circuit C26R27 produces a positive pip at the leading edge of the trigger pulse, an instant hereinafter designated as $t_0$. A negative pip at the trailing edge of the trigger pulse is disregarded. Prior to the arrival of the positive pip on grid 25 no anode current flows in tube $V_1$ and there is no voltage drop across the resistor 29 through which anode 30 of $V_1$ is connected to 300-volt battery 31. Battery 31 is also connected through resistor 32 to anode 33 of tube $V_2$, a double triode such as a 6N7, through resistor 34 to grid 35 and through resistor 29 to anode 36 of $V_2$. Cathodes 38 and 39 are electrically connected together and through resistors 40 and 41 in series to ground. The junction of resistors 40 and 41 is connected to grid 42 through resistor 43 while grid 42 is shunted to ground by condenser 44. Cathode 45 of $V_1$ is likewise grounded. In all circuits cathode heating power is understood to be supplied though not shown. Between ground and cathode 39 of $V_2$ are connected condenser 46 and resistance 47 in series, from the junction of which, through condenser 48 shunted by resistor 49, a square-topped voltage pulse negative to ground of 100 microseconds duration is fed to range sweep generator 50. Also to generator 50 a square-topped voltage pulse, positive to ground, is fed from anode 33 of $V_2$. Of these voltage pulses, the former excites the rising sweep voltage produced by generator 50 while the latter provides the pedestal which the sweep voltage overlies.

In the circuit of Fig. 2, grid 25 of $V_1$ is normally biased to cut-off by battery 28. Grid 42 of tube $V_2$ is biased to cut-off by the voltage developed across resistors 40 and 41 in series by the flow of current in the right half of $V_2$ from anode 33 to cathode 38. Since grid 35 is connected through 1.5 megohm resistor 34 to battery 31, its voltage is slightly higher than that of cathode 38, namely, about 20 volts positive to ground and the right half of $V_2$ is normally conducting. Condenser 37 is connected between grid 35 and anode 36.

A positive voltage pip drives grid 25 positive, so that $V_1$ becomes conducting and its anode voltage falls. Anode 36 of $V_2$ is connected directly to anode 30 of $V_1$ and through condenser 37 to grid 35 of $V_2$. The fall of voltage at anode 30 thus is coupled through condenser 37 to grid 35 to cut off the right half of $V_2$, and the consequent disappearance of current from resistors 40 and 41 permits the left half of $V_2$ to become conducting.

Initially, $V_1$ is not conducting, anodes 30 of $V_1$ and 36 of $V_2$ are 300 volts positive to ground. In $V_2$ cathodes 38 and 39 as well as grid 35 are 20 volts positive while anode 33 is about 267 volts positive to ground, the right half of $V_2$ being conducting while the left half of that tube is blocked. Grid 42 of $V_2$ is thus 20 volts negative with respect to cathode 39 and condenser 37 is thus across a potential difference of 280 volts between anode 36 and grid 35. The positive voltage pip from differentiating circuit C26R27 makes $V_1$ conducting and the potential at anodes 30 and 36 falls to about 165 volts. This drop of 135 volts at anode 36 is communicated through condenser 37 to grid 35 which accordingly falls to 115 volts negative to ground cutting off the right half of $V_2$ so that the potential of anode 33 rises to 300 volts. The current in resistors 40 and 41 becomes momentarily zero, thus removing the 20-volt negative bias on grid 42 so that the left half of $V_2$ becomes conducting, its anode 36 remaining 165 volts positive to ground. A small current now flows in cathode resistors 40 and 41 and condenser 37 starts to readjust its charge to the new voltage difference about 146 volts, between anode 36 and grid 35. This involves a rise in potential of grid 35 which on reaching the cut-off potential −10 volts allows the right half of $V_2$ to conduct. Now the flow of current of resistors 40 and 41 results in cut-off of the left half of $V_2$ and the initial conditions are restored. The readjustment of the charge of condenser 37 is by a partial discharge through resistor 34 and the left half of $V_2$. The time constant C37R34 is 300 microseconds and the rise in potential at grid 35 of $V_2$ from −115 volts to −10 volts requires 100 microseconds. During this interval the potential of anode 33 is 300 volts rising abruptly from 267 volts at the instant $V_1$ becomes conducting and falling rapidly 100 microseconds later. This furnishes a 33-volt positive square-topped pulse. At the end of the 100-microsecond interval the potential of anode 33 falls slightly below the initial value of 267 volts because of a small flow of current from grid 35 to cathode 38. The 33-volt positive pulse is used as pedestal voltage in range sweep generator 50 and the terminal distortion is unimportant. Condenser 44 of capacitance .006 microfarad holds grid 42 at constant voltage with respect to ground. Simultaneously with the positive pulse at anode 33, there is produced a negative pulse across resistors 40 and 41 due to the abrupt drop and succeeding rise of current therein, a negative pulse which is taken off between cathode 39 and ground and is used as above stated to produce the sweep voltage in generator 50. Here the terminal distortion is harmful and is removed by the filter circuit comprising condenser 46, resistor 47 and condenser 48 shunted by resistor 49.

The input terminals of the circuit of Fig. 2 are A and ground G, across which the trigger pulse from generator 14 is applied. The output terminals are $B_1$, $C_1$ and ground G, the sweep producing pulse being taken between $C_1$ and ground, the pedestal pulse between $B_1$ and ground. Time base generator 24, which the circuit of Fig. 2 constitutes, defines the duration of the voltage rise in range sweep generator 50 and thus the range of the most distant target to be considered. The 100-microsecond interval, corresponding to a target distance of about 10 miles, is fixed by the choice of condenser 37 and resistor 34, in the case described 200 micromicrofarads and 1.5 megohms, respectively. The sweep interval is in any case preferably somewhat shorter than the interval between successive signals from antenna 7 which in some radar installations may be long enough for a 100-mile range to be dealt with.

Figure 3:
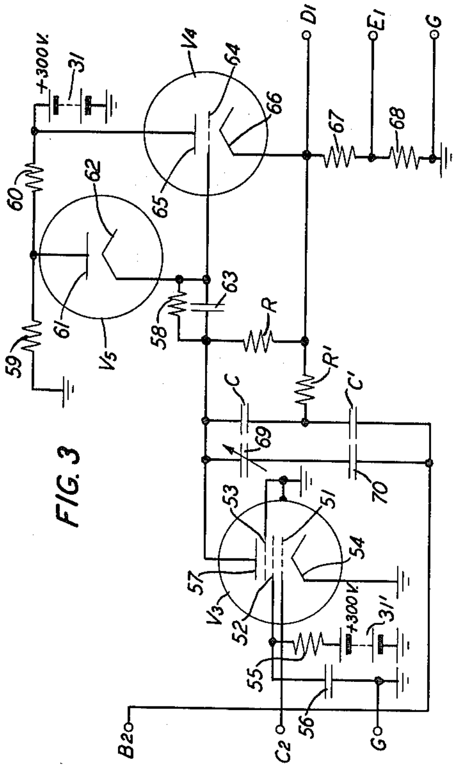
Fig. 3 is the circuit of range sweep generator 50.

In Fig. 3 is shown the circuit of range sweep generator 50. Input terminals for generator 50 are $B_2$ and $C_2$ on which are impressed positive and negative pulses from terminals $B_1$ and $C_1$ respectively, of Fig. 2, and ground G. The negative square-topped voltage pulse at terminal $C_1$ of Fig. 2 is applied at terminal $C_2$ of Fig. 3 to grid 51 of tube $V_3$, a 6AC7, for example, initially conducting and rendered inactive when a negative pulse arrives at grid 51. Screen grid 52 of $V_3$ is supplied through resistor 55 from battery 31' which may be the same as battery 31 serving to supply all voltages of the system of Fig. 1. Grid 52 is shunted to ground by condenser 56 while suppressor grid 53 and cathode 54 are grounded. Anode 57 is supplied through resistor 58 and bias control tube $V_5$, a diode such as one-half of a 6H6, from the junction of resistors 59 and 60, these resistors constituting a voltage divider between battery 31 and ground whereby anode 61 of $V_5$ is supplied with 50 volts. Cathode 62 of $V_5$ is connected through resistor 58 to anode 57 of $V_3$. Condenser 63 shunting resistor 58 is connected between anode 57 of $V_3$ and grid 64 of tube $V_4$ which is suitably one-half of a 6SN7GT. Anode 65 of $V_4$ is supplied directly from battery 31 while between cathode 66 and ground are connected resistors 67 and 68 in series.

Resistor R, preferably 200,000 ohms, is connected between cathode 66 and the junction of condenser 63 with anode 57. Between anode 57 and input terminal $B_2$ are connected condenser C, about 200 micromicrofarads, and condenser C′, which may be 1,000 micromicrofarads, in series. Shunting this connection of condensers C and C′ are condensers 69 and 70 in series serving as a trimming capacitance. Condenser 69 is suitably an air condenser, while condenser 70 may have a capacitance of 1,000 micromicrofarads. Resistor R′, about 330,000 ohms, is inserted between cathode 66 and the junction of condensers C and C′.

It will be observed that the positive pedestal voltage pulses from time base generator 24 applied to input terminal $B_2$ are interposed between ground and the circuit of Fig. 3 to the right of tube $V_3$. Further, those acquainted with sweep voltage generators, well described, for example, in "Time Bases" by O. S. Puckle, published in London in 1943, will recognize that the circuit of Fig. 3 is such a generator, inactive while tube $V_3$ is conducting but generating a rapidly rising voltage starting from the instant when $V_3$ is blocked by the negative pulse applied to grid 51 from generator 24. This rapidly rising voltage rises substantially linearly with time and continues so to rise until the negative pulse from generator 24 has passed from grid 51. The rate of voltage rise, controlled by the ratio of the voltage across condenser 63 to the product RC, is in the present circuit about 1 volt per microsecond. This sweep voltage appears as a voltage positive to ground at cathode 66 to which output terminal $D_1$ is connected. Tube $V_4$ is an amplifier tube supplying negative feedback to linearize this voltage wave as a function of time while the circuit R′C′ is an integrating circuit further contributing to the desired linearity.

The output voltage from the circuit of Fig. 3 is taken from terminal $D_1$ and ground, or a desired fraction of it may be taken between terminal $E_1$ and ground. Terminal $D_1$ is used when switch S, Fig. 1, is closed downward, terminal $E_1$ when S is closed upward.

Resistors 55, 59 and 60 are respectively about 68,000, 20,000 and 100,000 ohms while resistor 58 is 2.2 megohms. Resistors 67 and 68 are about 250,000 and 50,000 ohms, respectively, so that the pedestal and sweep voltages at terminal $E_1$ are each about one sixth those at terminal $D_1$.

It will be clear from the foregoing description that in the circuit of Fig. 2 tube $V_2$ is a single-shot multivibrator synchronized by tube $V_1$ with the trigger pulse which simultaneously actuates radar system 1. The output negative pulse from terminal $C_1$ controls the conductance of tube $V_3$ in the circuit of Fig. 3, and the duration of the voltage rise at terminals $D_1$ and $E_1$ of Fig. 3. This voltage rise is linearized by negative feedback from tube $V_4$ and further improved in linearity by the integrating circuit R′C′, for which values of resistance and capacity are chosen with regard to the values of R and C and the amplification factor of tube $V_4$. Diode $V_5$ is so inserted that in the intervals between successive sweeps condenser 63, of .006-microfarad capacitance, may be rapidly charged by diode $V_5$ through tube $V_3$, which is during such intervals conducting, and so be at a fixed potential at the start of each successive pulse from tube $V_2$. The circuit of Fig. 3 is not itself a part of the present invention but is disclosed and claimed in the copending application of J. W. Rieke, filed March 21, 1944 Serial No. 527,457 assigned to the same assignee as the present application.

The voltage at terminal $D_1$ varies from about 100 to about 200 volts, starting with about 65 volts during the interval between sweeps, to which a 33-volt pedestal is added at the start of the sweep.

Figure 4:
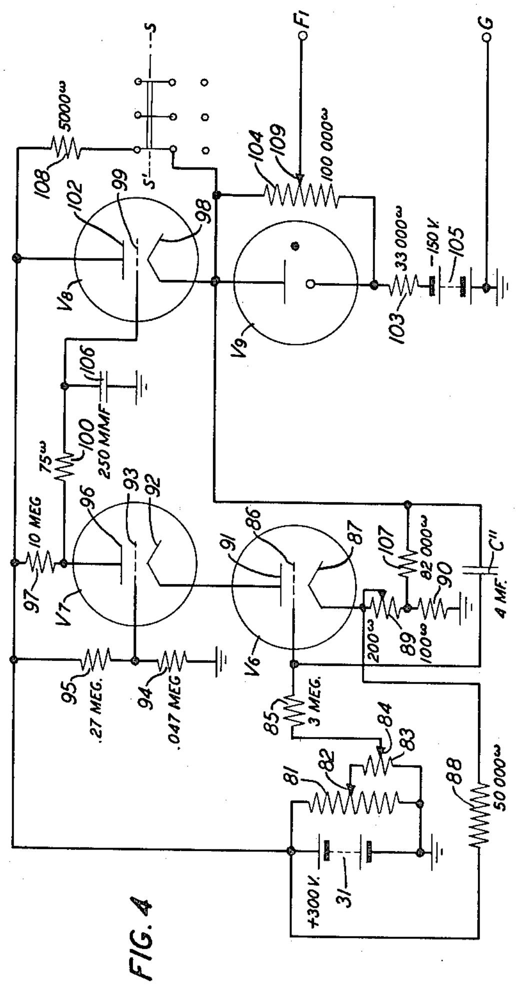
Fig. 4 is the circuit of rate sweep generator 80.

The rate sweep generator, of which the circuit is shown in Fig. 4, provides a voltage slowly decreasing between terminal $F_1$ and ground from about 200 to about 100 volts over a time interval varying from 1½ to 6 minutes. The circuit of Fig. 4 includes vacuum tubes $V_6$, $V_7$ and $V_8$ and voltage regulator tube $V_9$. Suitably tubes $V_6$ and $V_7$ are respectively, the two triodes contained in a 6SL7, $V_8$ is one-half of a 6SN7GT, while $V_9$ is a VR75. Battery 31 supplies the voltage required in the circuit of Fig. 4. Across this battery is connected potentiometer 81 of about 10,000 ohms resistance, on which tap 82 selects a fractional voltage adjusted, as later described, to be proportional to the speed of the airplane relative to the target. This fractional voltage appears across resistor 83, about ½ megohm, and from a fixed point 84 thereon about $\frac{1}{10}$ of the voltage selected by tap 82 is applied through 3-megohm resistor 85 to grid 86 of tube $V_6$. Cathode 87 is connected through resistor 88 to the positive terminal of battery 31 and to ground through the 300 ohms of resistors 89 and 90 in series. Variable resistor 89 is so adjusted that when tap 82 is at ground no current flows in resistor 85.

Anode 91 of $V_6$ is directly connected to cathode 92 of $V_7$ of which grid 93 is positively biased from the junction of resistors 94 and 95 to a potential of about 45 volts. Anode 96 of $V_7$ is supplied from battery 31 through 10-megohm resistor 97. Sweep condenser C″, 4 microfarads, together with resistor 85 constitutes the sweep circuit controlled by the voltage taken between point 84 and ground. Effectively condenser C″ is connected between grid 86 of $V_6$ and anode 96 of $V_7$, which tubes constitute a direct coupled direct current amplifier supplying negative feedback to linearize with time the variation in voltage across condenser C″. Actually, instead of being directly joined to anode 96, condenser C″ is connected to cathode 98 of tube $V_8$, of which grid 99 is joined through resistor 100 to anode 96 of $V_7$. Anode 102 of $V_8$ is directly supplied from battery 31, the load resistor of $V_8$ being composed of voltage regulator tube $V_9$ in series with resistor 103. Across tube $V_9$ is shunted resistor 104 which may be of 100,000 ohms resistance and is tapped to furnish at terminal $F_1$ a desired fraction of the constant voltage across tube $V_9$, plus the decreasing voltage across resistor 103. Battery 105, provides a negative voltage to stabilize tube $V_9$. Grid 99 of $V_8$ is shunted to ground by condenser 106, which with resistor 100 serves to prevent oscillations of voltage at grid 99. Tube $V_8$ functions as a cathode follower tube so that condenser C″ when connected between cathode 98 of $V_8$ and grid 86 of $V_6$ is effectively connected between that grid and anode 96 of $V_7$. To increase the amplification positive feedback is provided by resistor 107 between cathode 98 of $V_8$ and cathode 87 of $V_6$, thereby raising the amplification of the amplifier circuit to 5,000.

Switch S′ is closed as shown in Fig. 4, when switch S of Fig. 1 is closed upward. Closing switch S′ connects battery 31 through 5,000-ohm resistor 108 to one plate of condenser C″, the other plate thereof being connected to grid 86, which is at ground potential and only about 2 volts negative to cathode 87. Condenser C″ accordingly charges to about 195 volts (battery 105 opposing battery 31) positive to ground at cathode 98, through resistor 108 and the grid-cathode circuit of $V_6$. This voltage also appears across tube $V_9$ and resistor 103, 75 volts being across tube $V_9$. Thus, the tap 109 on resistor 104 makes available at terminal $F_1$ 120 volts plus a desired fraction of 75 volts. This is a steady state voltage independent of the operation of the sweep circuit of Fig. 3. The equality of this voltage with the sweep voltage from range sweep generator 50 can be set by adjustment of tap 109 to occur at any desired instant in the 100-microsecond interval between near its end and near its beginning.

When switch S′ is opened, condenser C″ starts to discharge through 3-megohm resistor 85, the discharge rate being controlled by the voltage at tap 84. From the stated values of capacity of condenser C″ and of resistance of resistor 85 time constant C″R85 appears to be 12 seconds, but the effective time constant determining the linearity of the sweep is the product of this 12 seconds by the amplification factor obtained from tubes $V_6$, $V_7$ and $V_8$, namely 1,000 minutes. In the circuit of Fig. 4 enough amplification is provided to make unnecessary an integrating circuit such as R′C′ of Fig. 3. By analysis of the operation of Fig. 4 when switch S′ is opened, it may be shown that as condenser C″ discharges, grid 86 of $V_6$ remains substantially at ground potential, so that the discharge current through resistor 85 is determined by the voltage at tap 84. The operation is in effect a cancellation of the charge placed on condenser C″ when S′ is closed, by an opposing sweep charge whereby the voltage across C″ is caused to fall at a rate equal to E′/R85 C″ volts per second where E′ is the voltage to ground at tap 84. When E′ is 12 volts the voltage at cathode 98 and so at terminal $F_1$ will fall 1 volt per second, the voltage drop across $V_9$ is constant. Therefore, if initially with S′ closed, tap 109 is at cathode 98 and $E'=12$ volts, the instant of equality of the voltages from terminal $F_1$ and from terminal $D_1$ of Fig. 3 will move when S′ is opened in 100 seconds from near the end to near the beginning of the 100-microsecond interval prescribed by time base generator 24.

The rate sweep circuit of Fig. 4 is also not a part of the present invention but is described and claimed in the copending application of J. W. Rieke above referred to.

In the system of Fig. 1, the major components following range sweep generator 50 and the rate sweep generator 80 use known circuit arrangements and will be here described chiefly functionally, reference being made to the attached drawings for the circuit details. Referring to Fig. 5, vacuum tubes $V_{10}$ and $V_{11}$ of range differential amplifier 110 receive via terminals $D_2$ and $F_2$ on grids 111 and 112, respectively, the voltages appearing at points $D_1$ of Fig. 3 and $F_1$ of Fig. 4. Of these voltages the first is a rising sweep voltage lasting 100 microseconds, the second is a voltage slowly decreasing over a comparatively long time equaled by the rising voltage at an instant in the 100-microsecond interval depending on the positions of taps 82 and 109 of Fig. 4. Tube $V_{12}$ is an amplifying tube providing positive feedback to tube $V_{10}$ through constant current tube $V_{13}$ which is inserted between ground and joined cathodes 113 and 114 of tubes $V_{10}$ and $V_{12}$, respectively. The cathode current of tubes $V_{10}$ and $V_{12}$ is controlled by the potential of grid 115 of $V_{13}$. Tube $V_{11}$ is a buffer tube protecting rate sweep generator 80 from loading due to grid current in tube $V_{12}$, while voltage regulator tube $V_{14}$ controls the screen voltage of $V_{13}$.

It may be shown by analysis of the operation of the circuit of Fig. 5 that when the voltages at terminals $D_2$ and $F_2$ are equal there appears a square-topped positive pulse at anode 116 of $V_{12}$ which continues to the end of the 100-microsecond interval. This pulse is supplied from terminal $H_1$ to video mixing amplifier 140 and from terminal $H_1'$ when switch S is closed downward to vertical sweep amplifier 200.

It will be noted that the anode circuit of tube $V_{12}$ includes series inductance 271. When the square-topped positive pulse appears at anode 116, its beginning is accompanied by a sharp positive pulse, its ending by a sharp negative pulse, across inductance 271. In each 100-microsecond interval, the sharp positive pulse appears at the moment of equality of range and rate sweep voltages; the ensuing negative pulse occurs at the end of the interval and is of no effect. Inductance 271 is included also in the anode circuit of the corresponding tube of release differential amplifier 270 (Fig. 10), and across it another sharp positive pulse occurs at the moment of equality of the release sweep voltage and the release slant range voltage, the latter provided from computer 280. These two positive pulses occurs simultaneously when the actual slant range equals the release slant range and are taken from terminal $H_1''$ to operate release relay circuit 290. The square-topped pulses at terminals $H_1$ and $H_1'$ are unblanking voltages destined for intensity grid 18 of oscilloscope 3.

Video mixing amplifier 140, of Fig. 6, comprises pulse amplifying tube $V_{14}$, on grid 141 of which is impressed via terminal $H_2$ the pulse from terminal $H_1$ of Fig. 5, and video amplifier $V_{15}$ of which grid 142 receives at terminal K the echo signal from video amplifier 17 of Fig. 1. The bias of grid 142 is controlled by tube $V_{17}$. The amplified positive pulse at anode 143 of $V_{14}$ and the amplified echo signal at anode 144 of $V_{15}$ are applied on grid 145 of tube $V_{16}$, from the cathode circuit of which are fed a pair of negative voltage pips corresponding respectively to the arrival of the echo signal at terminal K and the start of the square-topped pulse applied to terminal $H_2$. For a reason later given these voltage pips are delayed 5 microseconds by network 250. These delayed pips appear at terminal L, from which they are transmitted to the input of final video amplifier 170. Ground terminals, not shown, are provided for the circuits of Figs. 5 and 6 and subsequent figures.

Besides the components just described, the system of Fig. 1 includes release range computer 280, release sweep generator 260, release differential amplifier 270 and bomb release relay circuit 290, together with drift compensator 300 as well as final video amplifier 170 and vertical sweep amplifier 200. The description of amplifiers 170 and 200 is postponed. The release relay circuit comprises a coincidence circuit to which are supplied two sharp voltage pulses corresponding respectively to the instantaneous range and to the desired release range of the target. When these pulses coincide in time, the bomb release mechanism indicated symbolically by relay RLS (Fig. 12) is automatically actuated. This bomb release may be of any desired known character and is not itself a part of the present invention.

Release range computer 280 is shown in detail in Fig. 11.

Figure 7:
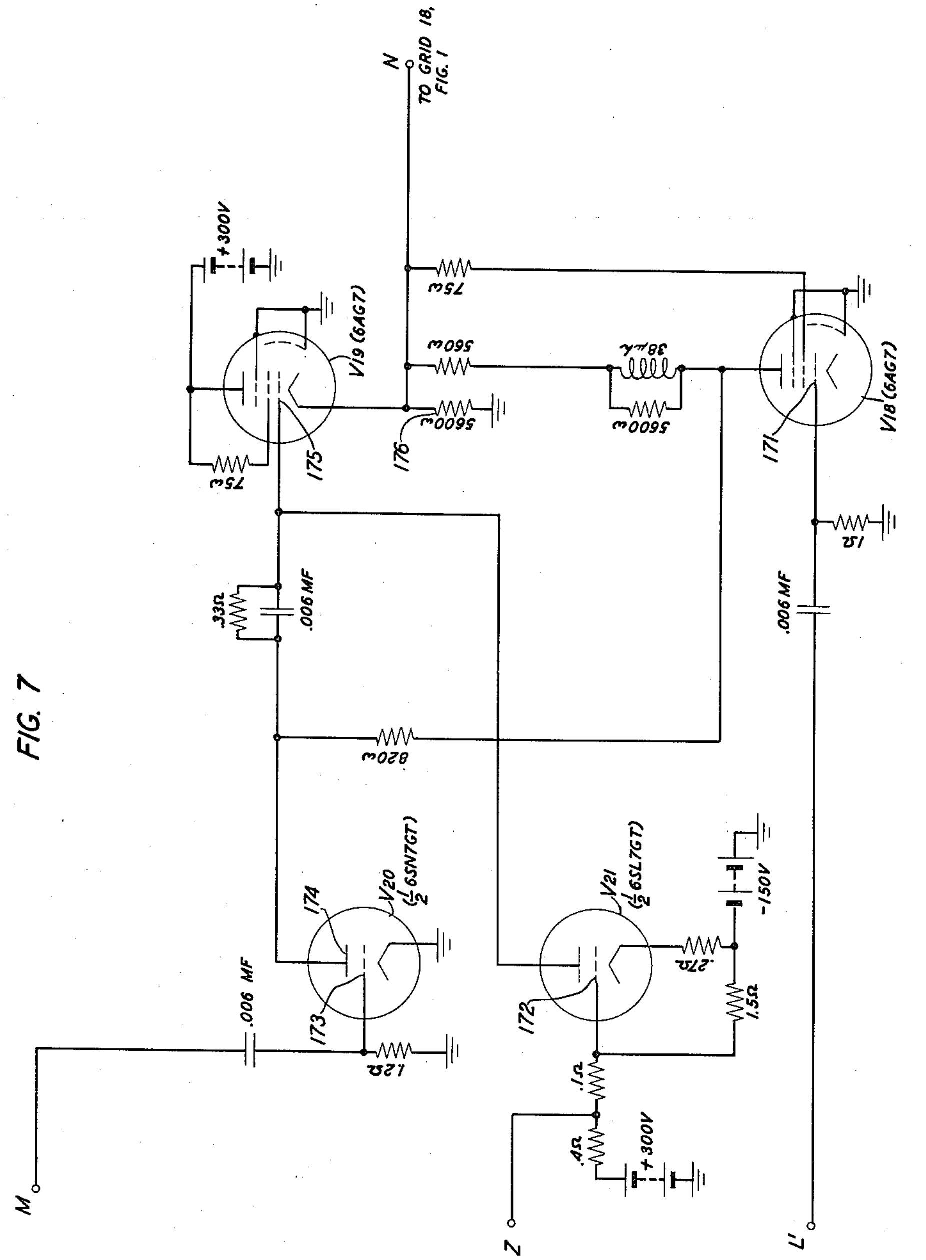
Fig. 7 is the circuit of final video amplifier 170.

Referring to Fig. 7, the functioning of final video amplifier 170 is briefly as follows. From video mixing amplifier 140 through terminal L of delay network 250 (Fig. 6), two negative voltage pulses are impressed via terminal L′ on grid 171 of tube $V_{18}$. The anode current of tube $V_{18}$ falls, resulting in increased anode current in tube $V_{19}$. The effect is to raise the potential to ground of the junction of the anode circuit of tube $V_{18}$ with the cathode of tube $V_{19}$ whenever either release or range pulse appears at terminal L′, and this rise in potential is a positive voltage pulse which is taken at terminal N to intensity grid 18 of oscilloscope 3.

This positive pulse is ineffective to brighten the trace on screen 2 except when superimposed on an unblanking pulse. For this, a square-topped negative pulse starting in each fundamental interval simultaneously with the equality of range and rate sweep voltages is derived from sweep amplifier 200 (Fig. 8) and is impressed via terminal M on grid 173 of tube $V_{20}$, anode 174 of which thereupon furnishes a positive square-topped pulse to grid 175 of tube $V_{19}$.

The ensuing increase in current in tube $V_{19}$ raises the cathode potential of that tube, forming a positive pedestal pulse starting at the moment of equality of range and rate sweep voltages and continuing to the end of the fundamental interval. The range and release voltage pulses from their respective differential amplifiers are delayed 5 microseconds by network 250 and are superimposed on this pedestal pulse. Provided the previously described azimuth blanking pulse from the radar is absent, which is the case when antenna 7 is directed in the forward hemisphere, the trace is brightened at the moment of superposition of either range or release pulse on the pedestal pulse. By a conventional connection including tube $V_{21}$, the azimuth blanking pulse is conveyed from terminal Z to grid 175 of tube $V_{19}$.

When switch S is closed upward ("search") both range and release pulses, as well as the target echo pulse are superimposed on the pedestal pulses. On "track," when switch S is closed downward, the release pulse cannot appear until the airplane is less than one-half mile from the bomb release point.

Figure 8:
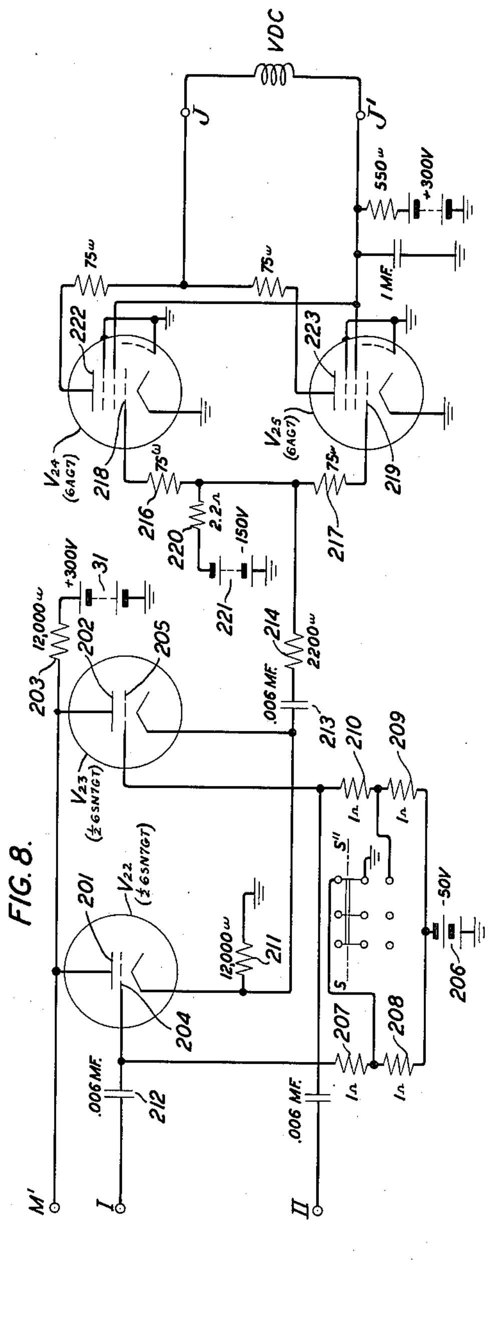
Fig. 8 is the circuit of vertical sweep amplifier 200.

Fig. 8 is a circuit diagram of vertical sweep amplifier 200. This amplifier is controlled via terminal I from the output of range sweep generator 50, or via terminal II from that of range differential amplifier 110, depending upon whether switch S is closed upward (search) or downward (track), respectively. The range sweep generator provides a positive rising sweep voltage (with pedestal) occupying the entire 100 microsecond interval, while the range differential amplifier furnishes a square-topped positive pulse starting at the moment of equality of range and rate sweep voltages and continuing to the end of the interval. Switch S″ is ganged with switch S to make the respectively appropriate circuit connections of tubes $V_{22}$ and $V_{23}$, of which control grids 204 and 205 are capacitatively coupled to terminals I and II, respectively.

Grids 204 and 205 are each connected to −50 volt battery 206 through resistors 207—208 and 210—209, respectively, when switch S is open, in which case both $V_{22}$ and $V_{23}$ are cut off. The cathodes of $V_{22}$ and $V_{23}$ are joined together and grounded through resistor 211. On closing switch S″ downward, the bias of grid 205 is removed and $V_{23}$ conducts. The positive square-topped pulse from the range differential amplifier then appears as a like pulse at the two cathodes of $V_{22}$ and $V_{23}$ and is transmitted through condenser 213 and resistor 214 ultimately to reach grid 218 of tube $V_{24}$ and grid 219 of tube $V_{25}$. These two last named tubes constitute parallel amplifiers furnishing between terminal J (connected to the two anodes) and terminal J′ (connected to the two screen grids) a beam deflecting voltage across vertical deflection coil VDC. This voltage abruptly appearing across coil VDC results in a current therein which increases nearly linearly with time for a short period, the 11 microseconds necessary for the operation on track.

Closing S″ upward (search) removes the bias of grid 204 and $V_{22}$ conducts, so that across cathode resistor 211 a positive saw-toothed voltage appears which is amplified by tubes $V_{24}$ and $V_{25}$ to send through vertical deflection coil VDC a voltage rising almost linearly with time. For each direction of closing switch S″, the positive voltage appearing across resistor 211 is accompanied by a negative voltage change of anode 201 (or 202, as the case may be) and this negative pulse is available at terminal M′ for transmission to terminal M for final video amplifier 140.

Figure 9:
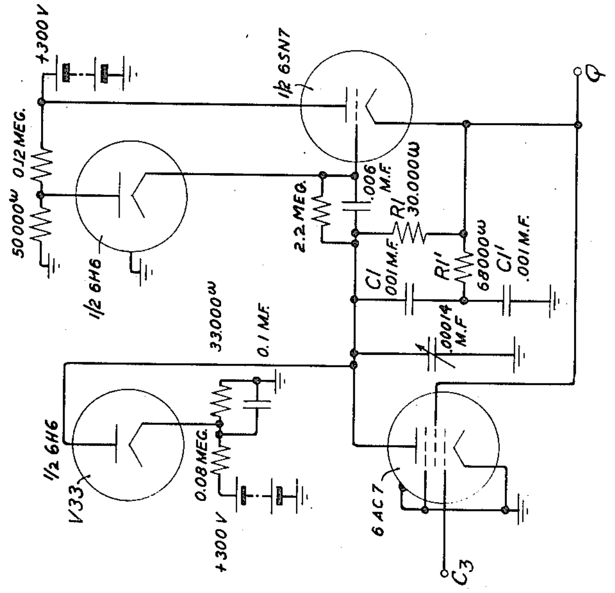
Fig. 9 is the circuit of release sweep generator 260.

Release sweep generator 260 comprises the circuit shown in Fig. 9. It operates in the same way as range sweep generator 50 except that the involved time constants $R_1C_1$ and $R_1'C_1'$ are chosen to produce a saw-tooth voltage rising about 5 volts per microsecond but flattened after about 18 microseconds by the operation of limiter tube $V_{33}$. Moreover, instead of being compared with the decreasing voltage as in the case of range sweep generator 50 the flattened saw-tooth voltage from the circuit of Fig. 9 is compared with a fixed voltage derived from the computing circuit 280. Terminal $C_3$ receives the negative square-topped pulse from terminal $C_2$ of time base generator 24 (Fig. 2). The truncated saw-tooth voltage, starting at the beginning of each 100-microsecond interval, appears at terminal Q for transmission to release differential amplifier 270.

Figure 10:
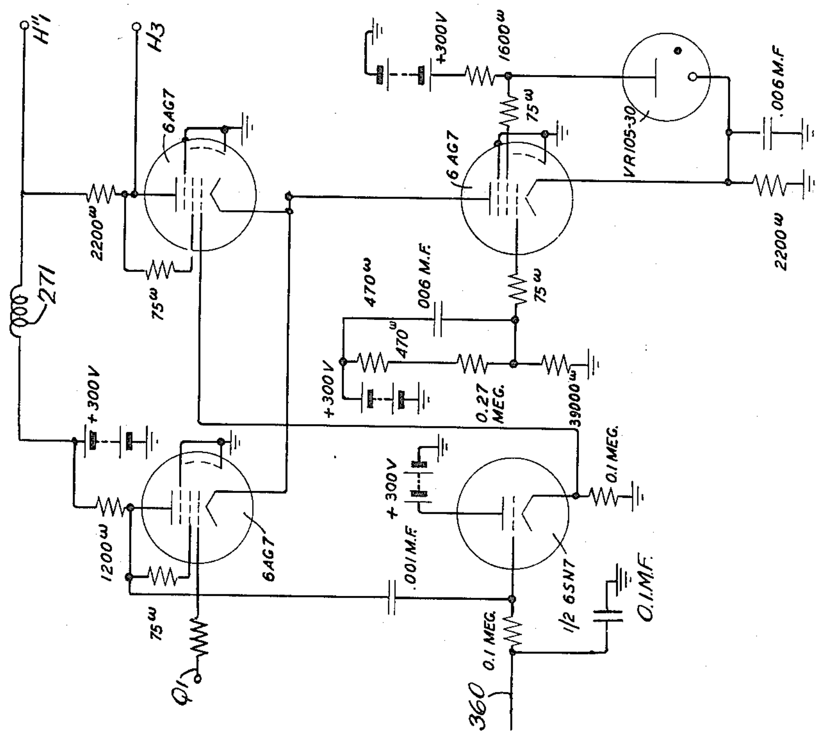
Fig. 10 is the circuit of release differential amplifier 270.

Release differential amplifier 270 shown in circuit detail in Fig. 10 operates exactly as does range differential amplifier 110 except that the flattened saw-tooth voltage from release sweep generator 260 is equalled by the voltage from computing circuit 280 at a constant time after the start of the 100-microsecond interval provided by time base generator 24. At terminal $Q_1$ the release sweep voltage from terminal Q, Fig. 9, is applied through a small resistance to the control grid of a pentode, suitably a 6AG7 as shown. At terminal $H_3$ a positive square-topped pulse appears beginning in each 100-microsecond interval at the moment of equality of release sweep and release slant range voltages and terminating at the end of the interval. The release slant range voltage is received via conductor 360 from computer 280. The pulse at terminal $H_3$ is taken to the input of video amplifier 140 as is the pulse at terminal $H_1$ of Fig. 5.

Across inductance 271 in Fig. 10, physically that already shown in Fig. 5, appears a sharp positive pulse simultaneously with the beginning of the square-topped pulse at terminal $H_3$; this sharp pulse is taken from terminal $H_1''$ (the same as the like-lettered terminal of Fig. 5) to release relay circuit 290. The two pulses at $H_1''$ are initially separated in time but coalesce when actual slant range equals release slant range.

The output voltages from range differential amplifier 110 and release differential amplifier 270 are each a square-topped positive pulse beginning the first at an instant in the time base interval corresponding to the actual range, the second at an instant in that interval corresponding to the desired release range. Simultaneously with the start of each of these pulses appears across inductance 271, common to the anode circuits of both differential amplifiers.

These sharp voltage pulses are applied to the input $H_2$ of bomb release circuit 290 shown in simplified form in Fig. 12. This circuit includes marginal amplifier $V_{34}$ and release pulse amplifier $V_{35}$. These amplifiers are suitably two triodes of a 6N7. Of release amplifier tube $V_{35}$, grid 272 is joined to 300-volt battery 31 through 2.2-megohm resistance 273 while anode 274 is supplied from that battery through 2200-ohm resistor 275. $V_{35}$ is thus conducting and the voltage drop across variable cathode resistor 276 common also to $V_{34}$ causes the latter tube to be cut off in the absence of a positive voltage on its grid 277. Further it is arranged that the sharp positive voltage pulses across inductance 271 transferred to grid 277 of $V_{34}$ shall separately be insufficient to render this tube conducting but shall when simultaneously present overcome the bias of grid 277. This occurs when the plane is at an actual slant range from the target equal to the release range appropriate to the plane's altitude and speed. These sharp positive voltage pulses unite to make $V_{34}$ conducting. The voltage at anodes 278 and 274 of $V_{34}$ and $V_{35}$, respectively, abruptly falls. When this voltage drop drives to cut-off grid 272 of $V_{35}$, there results across resistor 279 a strong positive voltage pulse which may be utilized through a conventional electronic switch to close release relay RLS. The bomb release mechanism energized by the closing of this relay may be of any desired character, unnecessary here to describe in detail.

For the computation of release range by the circuit of Fig. 11, a voltage proportional to a slant range speed is provided at tap 82 of Fig. 4. This, or any other voltage satisfactory to represent speed is used in computer 280 as follows:

Referring first to Fig. 11A consider a body B initially traveling at a horizontal velocity $v$ and released from point $P_1$ above the surface $P_2P_3$. Call this altitude, $P_1P_2$, A. Neglecting air resistance, the time of fall $$t=\sqrt{\frac{2A}{g}}$$

where $g$ is the acceleration due to gravity, and the horizontal distance H traveled by B during this time of fall is $$H=vt=v\sqrt{\frac{2A}{g}}$$

If it is desired to release the body from altitude A to strike at point $P_3$ this release must occur directly over point $P_2$ where $P_2P_3=vt$. In Fig. 11A the actual fall of the body B is along the dashed parabola $P_1$ to $P_3$ while the slant range from the point of release to the point of impact is the straight line $P_1P_3$. The proportions of the triangle $P_1P_2P_3$ in Fig. 11A are those of the case where the attacking plane is traveling at approximately 170 miles an hour at an altitude of 1500 feet. H is then 2400 feet and the slant range S is 2830 feet, approximately. In Fig. 11A, $P_2P_3=H$, $P_1P_3=S$, and $P_1P_4=S-H$.

Given means for measuring the altitude and the ground speed of the airplane, it is possible to represent these quantities by electrical voltages and resistances. Such measuring means will be assumed herein. The altitude is obtained from any suitable altimeter and the ground speed may for the present purpose be taken as that read on any known air speed meter. For the sake of simplicity it will be here assumed that there is no wind and that the target is stationary at $P_3$. Any suitable range finder may be used to determine the range from airplane to target at any instant and the range $P_1P_3$ at which bombs should be released is represented by the apparatus of the present invention as an electrical voltage.

$$\text{If } H=v\sqrt{\frac{2A}{g}}, \text{ then } S=\sqrt{A^2=H^2}=\sqrt{A^2+\frac{2v^2A}{g}}$$

It is difficult to establish a voltage representing this expression for S, while it is quite simple to represent by voltages both altitude and ground speed. S may be decomposed into two components, H and $S-H$, and these may be represented by voltages which are summed to yield a voltage representative of S. So decomposing S we find $$S-H=\sqrt{A^2+\frac{2v^2A}{g}}-\sqrt{\frac{2A}{g}}$$

This expression, apparently intractable to an electrical circuit, can be approximated by:

$$S-H=K\frac{A^{3/2}}{v+A^{1/2}}$$

where A and $S-H$ are in feet and $v$ is in miles per hour.

Referring now to Fig. 11, battery 310 supplies 300 volts across potentiometers 311, 312 and 313. Potentiometers 311 and 313 are linear and respectively of resistances approximately 10,000 and 20,000 ohms. These potentiometers are swept by wipers 321 and 323, respectively, and the resistance between ground and either of wipers 321 and 323 is proportional to the wiper's distance from the grounded end of the potentiometer. Potentiometer 312, traversed by wiper 322, is so wound that the resistance between ground and the position of wiper 322 is proportional to the square root of the distance of wiper 322 from the grounded end of potentiometer 312. Wiper 321 is connected to ground through potentiometer 314, suitably of resistance 125,000 ohms, wound similarly to potentiometer 312 and traversed by wiper 324. On graduated scales, not shown, are read the positions of wipers 321 to 324, inclusive. Wiper 322 is connected to ground through resistances 332 and 342 in series. Each of these resistances is variable, and of maximum resistances preferably about 100,000 ohms and 10,000 ohms, respectively.

Potentiometer 311 is tapped by wiper 321 to derive a voltage proportional to the ground speed of the airplane and this voltage is impressed across potentiometer 314 which is tapped by wiper 324 proportionately to the square root of the altitude. The voltage thus derived by wiper 324 is proportional to the speed times the square root of the altitude, and so to H. Potentiometer 312 is tapped by wiper 322 to include a resistance to ground proportional to the square root of the altitude, while the resistances of resistors 332 and 342 are adjusted to be proportional to ground speed $v$ and to altitude A, respectively. By simple computation it may be shown that there then appears between ground and the junction of resistors 332 and 342 a voltage proportional to $$\frac{A^{3/2}}{v+A^{1/2}}$$

or $S-H$, the factor K being allowed for in the summation circuit later described. The relative resistance values of 312, 332 and 342 determine the satisfaction of the equation where $v$ is in miles per hour and A in feet. Potentiometer 313 is tapped by wiper 323 to provide a correction voltage if such is for some reason desired, for example, to allow for the effect of air resistance or for a desired advance of the moment of bomb release.

Conductors 320, 330 and 340, connected respectively to wiper 323, to the junction of resistors 332 and 342, and through resistor 325 of about 50,000 ohms resistance to wiper 324, serve to apply to a summation circuit the three voltages of which the sum represents the slant range $P_1P_3$ of Fig. 1 corrected as required. The correction voltage from wiper 323 over conductor 320 is, of course, small and is empirically determined. The voltage over conductor 330 from the junction of resistors 332 and 342 represents $S-H$. In actual practice it has been found convenient to isolate the comparatively large voltage representing H, taken over conductor 340 from wiper 324, from the voltages with which it is combined, and this isolation is effected by means of vacuum tube $V_{31}$, a triode which may be one-half of a 6SL7. Battery 315, which may be identical with battery 310, supplies anode voltage to anode 343 of tube $V_1$. Conductor 340 impresses the voltage H on grid 344 of $V_{31}$ of which cathode 345 is biased negatively to ground by battery 335, conveniently 150 volts, through cathode load resistor 346 of which the resistance is about one-third megohm. Grid 344 is grounded through resistor 325 and a portion of potentiometer 314. Across load resistor 346 appears a voltage representative of H and this voltage, adjusted in scale to allow for the factor K in the formula for $S-H$, is transferred to a summing circuit.

Conductors 320, 330 and 350 are connected respectively to one-quarter megohm resistances 351, 352 and 353, the remote ends of which are joined together and their junction through one-tenth megohm resistor 354 is connected to grid 355 of vacuum tube $V_{32}$. Tube $V_{32}$ is suitably a triode, for example one-half of a 6SN7-GT. Anode 356 of tube $V_2$ is supplied from battery 315 while cathode 357 is grounded through one-tenth megohm resistor 358. Cathodes 345 and 357 are heated by conventional means, not shown. It may be shown by analysis that with the described connections of conductors 320, 330 and 350 to the grid of tube $V_{32}$, the voltage appearing across resistor 358 in the cathode circuit of that tube is proportional to the sum of the three voltages supplied to grid 355 through the respective resistors 351, 352 and 353. Accordingly, by conductor 360 the summation voltage representing the slant range $P_1P_3$ of Fig. 11A with any necessary correction from potentiometer 313, may be taken to a utilization circuit of any desired character.

In the apparatus of Fig. 11, potentiometers 312 and 314 and resistor 342 involve only the altitude and wipers 322 and 324 may be ganged together with the adjustment of resistor 342 and simultaneously set for the known altitude. Likewise, wiper 321 of potentiometer 311 may be ganged with the adjustment of resistor 332 in a single setting for ground speed. Altitude and ground speed scales may be located as desired, for example, in association with potentiometers 314 and 311, respectively.

To enable the attacking plane to fly a collision course toward its target, drift compensator 300, Fig. 1, is used as follows, referring to the apparatus shown in Fig. 13:

Gyroscope 430, which may be of any known type, is connected through shaft 431 to linkage 432 controlling the orientation of plate 433 which is free to rotate about shaft 434 fixed in the plane in a direction at right angles to the axis of rotation 435 of gyroscope 430. Plate 433 has generally the form shown in Fig. 13 and terminates at one end in toothed sector 436.

Brackets 440 and 440', fixed to plate 441 also rotatable about shaft 434, support at their upper extremities an optical sighting device represented schematically by telescope 442 of which eyepiece 443 carries the usual hair lines for sighting on a distant object. Brackets 440 and 440' carry at their lower extremities worm 437 meshed with sector 436. The gyroscope will, if the bombardier does not intervene, maintain the linkage 432 and the optical axis of telescope 442 in a vertical plane fixed in direction. Such apparatus is known to the art.

Plate 441 is connected at its narrow end to linkage 445 which controls through shaft 446 the angular position of wipers 447 and 447'. These wipers are mounted oppositely to each other on shaft 446, are insulated therefrom and from each other and traverse potentometer 448. From what has been said it will be clear that the absolute angular position of wipers 447 and 447' is also maintained fixed by gyroscope 430 independently of the bearing of the plane. Potentiometer 448 is fixed in the plane and connected at opposite ends of one diameter to the terminals of battery 449. From wipers 447 and 447' leads 450 are brought to the terminals of compensating coil 420.

Horizontal deflecting coil HDC carries no current when antenna 7 is directed forward. Likewise wipers 447 and 447' are initially so set that no current flows in coil 420 when the telescope is pointing dead ahead. If now the airplane is turned about a vertical axis while moving directly toward a target represented by dot 426 on screen 2 of oscilloscope 3, this dot will leave the vertical line through the center of screen 2 because antenna 7 is no longer pointed ahead when it intercepts a reflected pulse from the target. At the same time, however, brackets 440 and 440' will have turned about shaft 434 being controlled from gyroscope 430 through linkage 431 and will through linkage 445 rotate shaft 446 causing wipers 447 and 447' to apply a fraction of the voltage of battery 449 to leads 450. A current thus flows in compensating coil 420 and by suitable choice of voltage and poling of battery 449 this current can be adjusted to compensate the deflection of dot 426 due to current in coil HDC. It results that dot 426 will remain horizontally centered but vertically progressively lower as the plane approaches the target in a straight line.

Referring now to Fig. 13A suppose that at a given moment when the plane is at point P, dot 426 is horizontally centered and the plane is headed directly toward the target T in a cross-wind. At a later moment the plane will have reached P' and the target will bear left, say by the angle $\alpha_1$ degrees. The heading is unchanged so that coil 420 is currentless but dot 426 has moved from the central vertical line of screen 2 because the target is no longer ahead and the cathode ray trace is brightened when antenna 5 points $\alpha_1$ degrees left.

It remains to explain how the present invention enables the bombardier to intervene by manipulation of brackets 440 and 440' to recenter dot 426 and to prescribe to the pilot the heading on which to fly the collision course.

Referring again to Fig. 13A it is clear that to overcome the cross-drift to fly the course P'T, the plane must head toward point T'. The proportions of the diagram of Fig. 13A are, of course, exaggerated and the actual angle P'T'T is much nearer to 90 degrees than is there shown. The distance T'T is the drift in the flight time from P' to T and the leeway to be overcome is the angle T'P'T which equals the angle P'PT. The course made good is from P' to T oblique to the apparent heading from P' to T'. The drift is overcome by altering the plane's heading through an angle which is the sum of the leeway to be compensated and the bearing at P' of the target with respect to the original heading. If this bearing is as above designated $\alpha_1$ degrees and the change in heading is $\alpha_2$ degrees, the leeway is $\alpha=\alpha_2-\alpha_1$ degrees and the cross-wind velocity is $v \tan \alpha$, where $v$ is the speed of the plane with respect to the air in which it flies.

Worm 437 is carried on shaft 438 terminating in knob A. Concentric with shaft 438 but free to turn with respect thereto is sleeve 439 terminating at one end in knob B, which may be grasped at the same time as knob A, and at the other end in gear 451. Any rotation of knob B and with it of gear 451 is multipled by gears 452 and 453 the latter of which terminates shaft 454 supported as shown in brackets 440 and 440'. Between these brackets, shaft 454 carries worm 455 engaging sector 456 at one end of plate 457, which is mounted to turn freely on vertical shaft 434 as are plates 433 and 441. The narrow end of plate 457 carries potentiometer wiper 458 insulated from plate 457 and grounded.

The bombardier, observing that dot 426 has moved to the place indicated by dot 427, may turn only knob A. In this case he rotates brackets 440 and 440' around shaft 434 thereby through link 445 adding a differential rotation of wipers 447 and 447' on potentiometer 448. This results in a current through compensating coil 420 to recenter horizontally dot 426 on screen 2. The bearing of target T will now appear to be dead ahead when it is actually $\alpha_1$ left. The rotation of brackets 440 and 440' entails a corresponding movement of plate 457 and wiper 458.

Wiper 458 sweeps over resistance 459 which is in series with coils 460 and 461, the needle deflecting coils of the pilot's direction indicator PDI. The junction of coils 460 and 461 is connected to one terminal of battery 462, the other terminal of which is grounded. Obviously the shift of wiper 458 on resistance 459 results in a deflection of the needle of indicator PDI to one side or the other of zero which constitutes an order to the pilot to change heading until the needle again reads zero. Battery 462 is so poled that the deflection leads to a change of heading to the left, in the situation illustrated in Fig. 13A, and the sensitivity of the PDI may be controlled in this regard by adjustment of variable resistance 463 bridged across the terminals of resistance 459.

The correction of heading so obtainable is not enough for a collision course from point P'. It is seen from Fig. 13A that the angle $\alpha_2$ must be larger than angle $\alpha_1$. Accordingly, knob B must also be turned. Then, by reason of the step-up ratio of gears 451, 452 and 453, worm 455 causes plate 457 to rotate without motion of brackets 440 and 440'. In practice, knobs A and B may be turned together. The bombardier's procedure in correcting the course is as follows:

At point P' he observes the target to bear left. Thereupon he grasps both knobs A and B, recentering the target spot on screen 2 and at the same time prescribing a change of heading by the deflection of the needle of the pilot's direction indicator. The change prescribed is N times the target bearing corrected by tuning knob A, N being determined by the gear ratio of gears 451, 452, 453 and the relative sensitivities of HDC and drift correction coil 420. If the new heading is correct for a collision course from P' to T, the plane will fly the distance P'T' with respect to the air and in the time of this flight will drift to reach actually point T. The course made good will be P'T; the leeway will be the angle T'P'T, or the difference between the change in heading made at P' and the target bearing corrected at that point. That is, the leeway is $(N-1)\alpha_1$. The plane will be at every moment moving towards the target and dot 426 will stay on the vertical line through the center of screen 2.

In operating the coincidence circuit above described, switch S and associated switches S′ and S″ are thrown upward when the plane is estimated to be some 10 miles from the target. The radar system now provides on screen 2 a spot representing the target, assuming there is but one, which occupies a position determined vertically by the target range. It will be recalled that the vertical sweep of the cathode ray beam starts from the bottom of screen 2 at the moment of emission of a pulse of radiation from antenna 7. This target spot is brought to the central vertical line of screen 2 and by adjustment of tap 109, Fig. 4, range line RL (Fig. 14) is made to intersect it. With this closing of switch S the target spot is moving vertically downward as the range decreases. By suitably operating drift compensator 300 the target spot may be made to keep to the central line on screen 2, the plane flying a collision course toward the target and the target spot may, if desired, be followed by a range line RL by operating tap 109. Under these circumstances there appears on screen 2 also a horizontal line RL′ corresponding to the moment of equality of computed slant range voltage and release sweep voltage. This release line is stationary, while target spot and range line RL are moving. Both of these lines on the target spot are delayed by network 250 five microseconds after the start of the sweep.

On closing downward switch S and associated switches S′ and S″, the vertical sweep is made to begin from the instant of equality of range sweep and rate sweep voltages, and to last for about 11 microseconds, corresponding to a slant range distance about 1 mile from plane to target. The 5 microseconds delay of the radar echo and of the range line places the range line and echo spot central of the screen and proper adjustment of tap 84, Fig. 4 maintains coincidence of the target spot and the range line which therefore appears stationary on the screen 2. An approximate setting of tap 84 is made with reference to the air speed meter of the plane and the exact adjustment of this tap is made to preserve coincidence of echo spot and range line. Release line RL′ does not appear until the plane is within half a mile of the proper release point, whereupon line RL′ shows across the bottom of screen 2, rising toward coincidence with line RL. At the moment of actual range and computed release range are equal, lines RL and RL′ coincide, the range and release voltage pulses across inductance 271 coincide in time, the release mechanism is operated and the bombs are dropped.

Figs. 14 and 14A show the appearance on screen 2 when switches S, S′ and S″ are closed upward and downward, respectively.

Thus the system of the invention provides means for flying a bombing airplane in a collision course toward an actuated target, means for measuring the velocity of approach to that target, and means for actuating a bomb release mechanism at the proper moment for the bombs to strike the target.

What is claimed is:

1. For bombing an enemy target from an airplane provided with an electrically operable bomb release mechanism, a coincidence circuit for the automatic operation of said mechanism comprising means for repetitively defining a fixed time interval, means for finding the instantaneous range and rate of decrease thereof of said target, means associated with said range and rate finding means for producing a first repetitive voltage pulse at an instant in said interval corresponding to said range and occurring progressively earlier as said range decreases, means for computing a target range appropriate for the operation of said mechanism, means associated with said computing means for producing a second repetitive voltage pulse at a fixed instant in said interval corresponding to said appropriate range and eventually simultaneous with said first voltage pulse and means responsive to said pulses when simultaneous to produce a voltage pulse adapted to operate said mechanism.

2. For an airplane flying at known altitude and airspeed toward a target and equipped with bomb releasing means adapted to be operated by a voltage pulse and with electrical means for locating and ranging the target, said electrical means including means for emitting pulses of radiation repetitive at a desired frequency to be individually reflected from the target and target observing means comprising a cathode ray oscilloscope provided at least with a screen on which the target is represented by a luminous spot corresponding to the reception of a reflected pulse and appearing on the screen in a position vertically corresponding to the range of the target, a system of apparatus for operating said releasing means appropriately to bomb the target comprising means controlled by said electrical means for establishing simultaneously with each emitted pulse a time interval of constant length less than the interval between successive emitted pulses, means controlled by said interval establishing means for producing a first repetitive voltage rising linearly with time throughout said time interval, means for producing a voltage decreasing linearly with time throughout a period overlapping a plurality of said time intervals, means for comparing in successive time intervals said first voltage with said decreasing voltage and for producing on said screen a first horizontal luminous line corresponding in vertical position to the instant of equality of said compared voltages in successive time intervals, means for adjusting the initial magnitude and the rate of decrease of said decreasing voltage to make said first line continuously intersect the target spot, means controlled by said interval establishing means for producing a second repetitive voltage rising linearly with time throughout an initial portion of each time interval, computing means for producing a constant voltage proportional to the target slant range appropriate to bomb release at the known altitude and airspeed, means for comparing in successive time intervals said second voltage and said constant voltage and for producing on said screen a second luminous line corresponding in vertical position to the instant of equality of said last-named compared voltages, circuit means common to both said line producing means for generating at each of said instants of equality a voltage pulse of which voltage pulses that corresponding to the first-named instant occurs progressively earlier in successive time intervals while that corresponding to the second-named instant occurs at a fixed instant in each time interval, and means for summing said voltage pulses when simultaneous in a time interval to operate said bomb releasing means.

3. For an airplane flying at known altitude and airspeed toward a target and equipped with bomb releasing means adapted to be operated by a voltage pulse and with electrical means for locating and ranging the target, said electrical means including means for emitting pulses of radiation repetitive at a desired frequency to be individually reflected from the target and target observing means comprising a cathode ray oscilloscope provided at least with a screen on which the target is represented by a luminous spot corresponding to the reception of a reflected pulse and appearing on the screen in a position vertically corresponding to the range of the target, a system of apparatus for operating said releasing means appropriately to bomb the target comprising means controlled by said electrical means for establishing simultaneously with each emitted pulse a time interval of constant length less than the interval between successive emitted pulses, means controlled by said interval establishing means for producing a first repetitive voltage rising linearly with time throughout said time interval, means for controlling the vertical position of the target spot on the screen in accordance with said first voltage, means for producing a voltage decreasing linearly with time throughout a period overlapping a plurality of said time intervals, means for comparing in successive time intervals said first voltage with said decreasing voltage and for producing on said screen a first horizontal luminous line corresponding in vertical position to the instant of equality of said compared voltages in successive time intervals, means for adjusting the initial magnitude and the rate of decrease of said decreasing voltage to make said first line continuously intersect the target spot, means controlled by said interval establishing means for producing a second repetitive voltage rising linearly with time throughout an initial portion of each time interval, computing means for producing a constant voltage proportional to the target slant range appropriate to bomb release at the known altitude and airspeed, means for comparing in successive time intervals said second voltage and said constant voltage and for producing on said screen a second luminous line corresponding in vertical position to the instant of equality of said last-named compared voltages, circuit means common to both said line producing means for generating at each of said instants of equality a voltage pulse of which voltage pulses that corresponding to the first-named instant occurs progressively earlier in successive time intervals while that corresponding to the second-named instant occurs at a fixed instant in each time interval, and means for summing said voltage pulses when simultaneous in a time interval to operate said bomb releasing means.

4. For an airplane flying at known altitude and airspeed toward a target and equipped with bomb releasing means adapted to be operated by a voltage pulse and with electrical means for locating and ranging the target, said electrical means including means for emitting pulses of radiation repetitive at a desired frequency to be individually reflected from the target and target observing means comprising a cathode ray oscilloscope provided at least with a screen on which the target is represented by a luminous spot corresponding to the reception of a reflected pulse and appearing on the screen in a position vertically corresponding to the range of the target, a system of apparatus for operating said releasing means appropriately to bomb the target comprising means controlled by said electrical means for establishing simultaneously with each emitted pulse a time interval of constant length less than the interval between successive emitted pulses, means controlled by said interval establishing means for producing a first repetitive voltage rising linearly with time throughout said time interval, means for producing a voltage decreasing linearly with time throughout a period overlapping a plurality of said time intervals, means for comparing in successive time intervals said first voltage with said decreasing voltage and for producing on said screen a first horizontal luminous line corresponding in vertical position to the instant of equality of said compared voltages in successive time intervals, means for adjusting the initial magnitude and the rate of decrease of said decreasing voltage to make said first line continuously intersect the target spot, means for maintaining the target spot and said first luminous line in fixed vertical position on the screen, means controlled by said interval establishing means for producing a second repetitive voltage rising linearly with time throughout an initial portion of each time interval, computing means for producing a constant voltage proportional to the target slant range appropriate to bomb release at the known altitude and airspeed, means for comparing in successive time intervals said second voltage and said constant voltage and for producing on said screen a second luminous line corresponding in vertical position to the instant of equality of said last-named compared voltages, circuit means common to both said line producing means for generating at each of said instants of equality a voltage pulse of which voltage pulses that corresponding to the first-named instant occurs progressively earlier in successive time intervals while that corresponding to the second-named instant occurs at a fixed instant in each time interval, and means for summing said voltage pulses when simultaneous in a time interval to operate said bomb releasing means.

References Cited in the file of this patent

UNITED STATES PATENTS 1,924,174 Wolf ------------------- Aug. 29, 1933